(12) United States Patent
Galbraith

(10) Patent No.: US 8,500,852 B2
(45) Date of Patent: Aug. 6, 2013

(54) SORPTION METHOD, DEVICE, AND SYSTEM

(75) Inventor: S. Douglas Galbraith, Holbrook, PA (US)

(73) Assignee: Separation Design Group, LLC, Waynesburg, PA (US)

( * ) Notice: Subject to any disclaimer, the term of this patent is extended or adjusted under 35 U.S.C. 154(b) by 640 days.

(21) Appl. No.: 12/299,072

(22) PCT Filed: Apr. 30, 2007

(86) PCT No.: PCT/US2007/010500
§ 371 (c)(1),
(2), (4) Date: May 21, 2009

(87) PCT Pub. No.: WO2007/130377
PCT Pub. Date: Nov. 15, 2007

(65) Prior Publication Data
US 2010/0043633 A1    Feb. 25, 2010

Related U.S. Application Data

(60) Provisional application No. 60/798,597, filed on May 5, 2006.

(51) Int. Cl.
*B01D 53/02* (2006.01)

(52) U.S. Cl.
USPC ............ 95/114; 95/68; 95/96; 96/55; 96/130; 422/186.04; 422/186.2; 210/136; 210/670; 136/203; 62/324.1

(58) Field of Classification Search
USPC ........ 95/68, 96, 114; 96/55, 130; 422/186.04, 422/186.2; 210/136, 670; 136/203; 62/324.1
See application file for complete search history.

(56) References Cited

U.S. PATENT DOCUMENTS

| | | | |
|---|---|---|---|
| 3,359,707 A | 12/1967 | Jean | 55/33 |
| 3,463,944 A | 8/1969 | Melcher | 310/10 |
| 3,727,375 A | 4/1973 | Wallace | 55/2 |
| 3,730,885 A | 5/1973 | Makrides et al. | 210/30 |
| 3,771,234 A | 11/1973 | Forster et al. | 34/1 |
| 4,011,306 A | 3/1977 | Fox, Jr. | 423/579 |
| 4,038,050 A | 7/1977 | Lowther | 95/1 |

(Continued)

FOREIGN PATENT DOCUMENTS

| | | |
|---|---|---|
| DE | 197 44 470 A1 | 7/2000 |
| EP | 1 114 666 | 7/2001 |
| WO | 2005/081722 A2 | 9/2005 |

OTHER PUBLICATIONS

PCT/US2007/010500 International Search Report and Written Opinion dated Jan. 18, 2008.

(Continued)

*Primary Examiner* — Christopher P Jones
(74) *Attorney, Agent, or Firm* — Kilpatrick Townsend & Stockton LLP

(57) ABSTRACT

Methods, devices, and systems, and devices for carrying out sorption (adsorption and absorption) for separating and/or purifying fluid mixtures are disclosed. Medical oxygen generators, dehumidifying units, sorptive heat pumps, ozone generators and Peltier devices are also disclosed. The sorption methods involve pressure swing operation of at least two sorption units. Energy from the desorbing and decompressing fluid is substantially recovered and used within the system.

32 Claims, 15 Drawing Sheets

U.S. PATENT DOCUMENTS

| | | | | |
|---|---|---|---|---|
| 4,094,652 | A | | 6/1978 | Lowther .................... 96/143 |
| 4,114,380 | A | | 9/1978 | Ceperley .................... 60/721 |
| 4,124,021 | A | * | 11/1978 | Molitor .................... 126/299 E |
| 4,316,233 | A | | 2/1982 | Chato et al. .................... 361/233 |
| 4,322,394 | A | | 3/1982 | Mezey et al. ............ 423/244.11 |
| 4,954,320 | A | | 9/1990 | Birmingham et al. ... 422/186.04 |
| 4,964,889 | A | | 10/1990 | Chao .................... 95/96 |
| 4,968,329 | A | * | 11/1990 | Keefer .................... 95/98 |
| 5,085,780 | A | | 2/1992 | Ostreicher .................... 210/683 |
| 5,209,902 | A | * | 5/1993 | Matthews et al. ................ 422/21 |
| 5,256,172 | A | | 10/1993 | Keefer .................... 423/230 |
| 5,335,510 | A | | 8/1994 | Rockenfeller et al. .......... 62/106 |
| 5,396,775 | A | | 3/1995 | Rockenfeller et al. .......... 62/112 |
| 5,441,716 | A | | 8/1995 | Rockenfeller .................... 439/299 |
| 5,490,398 | A | | 2/1996 | Cline .................... 62/497 |
| 5,505,825 | A | | 4/1996 | Gold et al. .................... 95/126 |
| 5,535,817 | A | | 7/1996 | Dunne .................... 165/104.12 |
| 5,590,538 | A | | 1/1997 | Hsu et al. .................... 62/51.2 |
| 5,669,583 | A | | 9/1997 | Roth .................... 244/130 |
| 5,704,967 | A | * | 1/1998 | Tom et al. .................... 96/143 |
| 5,728,457 | A | | 3/1998 | Frechet et al. ............ 428/310.5 |
| 5,842,356 | A | | 12/1998 | Pfister et al. .................... 62/480 |
| 5,972,077 | A | | 10/1999 | Judkins et al. .................... 95/136 |
| 6,013,164 | A | | 1/2000 | Paul et al. .................... 204/450 |
| 6,019,882 | A | | 2/2000 | Paul et al. .................... 204/450 |
| 6,176,897 | B1 | | 1/2001 | Keefer .................... 95/98 |
| 6,200,539 | B1 | | 3/2001 | Sherman et al. ........ 422/186.04 |
| 6,271,509 | B1 | | 8/2001 | Dalton .................... 219/687 |
| 6,374,909 | B1 | | 4/2002 | Jeter et al. .................... 165/96 |
| 6,379,435 | B1 | * | 4/2002 | Fukunaga et al. ............ 96/111 |
| 6,434,955 | B1 | | 8/2002 | Ng et al. .................... 62/106 |
| 6,512,215 | B2 | | 1/2003 | Dalton .................... 219/759 |
| 6,641,644 | B2 | | 11/2003 | Jagger et al. .................... 95/96 |
| 6,692,626 | B2 | | 2/2004 | Keefer et al. ................ 204/491 |
| 7,077,891 | B2 | | 7/2006 | Jaffe et al. .................... 96/108 |
| 2001/0000889 | A1 | | 5/2001 | Yadav et al. .................... 204/242 |
| 2001/0008212 | A1 | | 7/2001 | Shepodd et al. ............ 204/451 |
| 2002/0023453 | A1 | | 2/2002 | Davidson et al. ............ 65/259.2 |
| 2002/0122728 | A1 | | 9/2002 | Darabi et al. .................... 417/48 |
| 2002/0170436 | A1 | | 11/2002 | Keefer et al. .................... 96/121 |
| 2003/0015092 | A1 | | 1/2003 | Moreau et al. .................... 95/96 |
| 2003/0019238 | A1 | | 1/2003 | Pfister et al. .................... 62/497 |
| 2003/0089228 | A1 | | 5/2003 | Kulprathipanja et al. ........ 95/45 |
| 2003/0106429 | A1 | * | 6/2003 | Wang et al. .................... 95/90 |
| 2003/0116016 | A1 | | 6/2003 | Monzyk et al. .................... 95/148 |
| 2003/0131729 | A1 | | 7/2003 | Tonkovich et al. ............ 95/106 |
| 2003/0167921 | A1 | | 9/2003 | Golden et al. .................... 95/96 |
| 2003/0196885 | A1 | | 10/2003 | Marchitto et al. ........ 204/157.15 |
| 2004/0069144 | A1 | | 4/2004 | Wegeng et al. ................ 95/106 |
| 2004/0097371 | A1 | | 5/2004 | Jangbarwala ................ 502/439 |
| 2004/0107831 | A1 | | 6/2004 | Graham et al. .................... 95/96 |
| 2004/0118287 | A1 | | 6/2004 | Jaffe et al. .................... 96/121 |
| 2005/0121393 | A1 | * | 6/2005 | Galbraith .................... 210/670 |
| 2005/0145111 | A1 | | 7/2005 | Keefer et al. .................... 96/124 |
| 2011/0030556 | A1 | | 2/2011 | Pelletier et al. | |

OTHER PUBLICATIONS

PCT/US2007/010500 International Preliminary Report on Patentability dated Nov. 20, 2008.

EP07776537.8 Examination Report from the European Patent Office dated Feb. 18, 2010.

Boscolo, I. et al., "Application of Ferroelectric Cathodes to Enhance the ION Yield in the Caesar Source at LNS", *Proceedings of EPAC*, 2000, 1631-1633.

Collins, P. et al., "Creating High Performance Conductive Composites with Carbon Nanotubes", www.Hyperioncatalysis.com, *Materials Managers Symposium*, Jun. 2004, 8 Pages.

Fuhr, G. et al., "Travelling Wave-Driven Microfabricated Electrohydrodynamic Pumps for Liquids", *J. Micromech. Microeng*, 1994, 217-226.

Gitlin, I. et al., "Pumping Based on Transverse Electrokinetic Effects", *Department of Chemistry and Chemical Biology, Harvard University*, Cambridge, MA, U.S.A. 15 pages, 2003.

Judkins, R.R. et al., "$CO_2$ Removal from Gas Streams using a Carbon Fiber Composite Molecular Sieve", $8^{th}$ *Conference on Fundamentals of Absorption*, May 2004, 14 pages.

Kong, M.G. et al., "Wave Form to Produce most Efficiency Discharges", *Dept. of Electronic and Electrical Engineering*, http:/www.ee.ualberta.ca/icops2002/programest/1A.htm, Apr. 20, 2004, 1 page.

Ter Brake, H.J.M. et al., "Vibration Free 5K Sorption Cooler" for ESA's Darwin Mission, *University of Twente, Faculty of Applied Physics, MESA Research Institute, Cryogenics*, Feb. 2002, 42(2), 14 pages.

Wang, R.Z. et al., "Adsorption Mechanism and Improvements of the Adsorption Equation for Adsorption Refrigeration Pairs", *International Journal of energy Research*, 1999, 23, 887-898.

Roth, J.R., "Subsonic Plasma Aerodynamics Using Paraelectric and Peristaltic Electrohydrodynamic (EHD) Effects", *Department of Electrical and Computer Engineering, University of Tennessee, Knoxville, Presented at the $29^{th}$ IEEE International Conference on Plasma Science*, May 26-30, 2002.

Curtis, F.W., High-Frequency Induction Heating, *Lindsay Publications*, 1987, 12-15 and 218-220 (Chapter IX).

Dean, K.A., et al., "Current saturation mechanisms in carbon nanotube field emitters," *J. Appl. Physics Lett.*, 2000, 76(3), 375-377.

Hubble, J., "Biochemical Separations—Adsorption and chromatographic separations," www.bath.ac.uk/~cesjh/adsorb.htm, downloaded from the Internet on Oct. 6, 2006, 1-32.

Feng, C., et al., "Breakthrough and desorption characteristics of a microtrap," *J. of Microcolumn Separations* 2000 12(4).

Modi, A., et al., "Miniaturized gass ionization sensors using carbon manotubes," *Nature*, 2003, 424, 171-174 (1 page Abstract).

\* cited by examiner

Adsorbent Contactor A

Cycle Number

| 0 | 1000 | 2000 | 3000 . . . |

↑ ↑ ↑ ↑

Adsorbent Contactor B

Cycle Number

| 500 | 1500 | 2500 . . . |

↑ ↑ ↑

SORPTION METHOD, DEVICE, AND SYSTEM

CROSS-REFERENCE TO RELATED APPLICATIONS

This application is the National Stage of International Application No. PCT/US2007/010500 filed Apr. 30, 2007, which claims the benefit of U.S. Provisional Application No. 60/798,597 filed May 5, 2006, the disclosures of which are incorporated herein by reference in their entireties.

REFERENCE TO GOVERNMENT GRANTS

Portions of the disclosure herein may have been supported in part by grants from the National Science Foundation/Small Business Innovative Research Grant No. 0419821 and the National Institutes of Health/Small Business Technology Transfer Research Grant No. 1 R41 HL080825-01. The United States Government may have certain rights in this application.

FIELD OF THE INVENTION

The invention relates generally to methods, devices, and systems for carrying out sorption (both adsorption and absorption) processes for separating and purifying fluid mixtures and, more particularly, to methods, devices, and systems employing, inter alia, a reciprocating biaser for separation and purification processes.

BACKGROUND OF THE INVENTION

Adsorption is a process by which a gas, liquid, or dissolved material is assimilated onto the surface of a solid or liquid material and defined in terms of adsorptive surface area per unit mass. In contrast, an absorption process entails incorporation of materials into the pores or interstitial spaces, as opposed to only the surface, of an absorbent material. An adsorbing material/adsorbent or an absorbing material/absorbent is called sorbent. A material being sorbed (either adsorbed or absorbed) is called the sorbate (either adsorbate or absorbate).

A number of different factors and mechanisms influence the adsorption process. For example, polar molecules are often more easily adsorbed. Similarly, molecules with small kinetic diameters can be preferentially adsorbed relative to molecules with larger kinetic diameters. Additionally, the condensation characteristics of the sorbate can also affect the adsorption process. Furthermore, the quadrupole moment of a molecule may make it more easily adsorbed than another molecule. Accordingly, adsorption systems can manipulate these factors and mechanisms to separate components of complex mixtures and/or to effect selective vapor condensation.

A simple, traditional adsorption system has two separate vessels filled with sorbent material. The sorbents are often complex chemical structures having powerful attractive forces and are capable of higher degrees of selectivity and molecular discrimination than membrane filters. A mixture is passed over the sorbent material of one of the vessels causing a component of the mixture to be removed from the feed stream. Once the sorbent in the first vessel is no longer able to adsorb any more material, the feed stream is switched to the second sorbent containing vessel. While the second vessel is adsorbing, the first vessel is being purged (i.e. desorbed) of the adsorbed material. Thereafter, the first vessel is substituted for the second vessel while the second vessel is purged. This process, known as swing adsorption, is repeated as needed.

The material handling capacity of such adsorption systems depends on a number of variables, including vessel size (i.e. sorbent mass), cycle time and operating pressure, as well as sorbent/adsorbate affinity. For example, increasing vessel size, and hence the volume and mass of sorbent, increases adsorption capacity. Similarly, decreasing the cycle time provides a concomitant increase of available adsorption sites per unit time. Increasing the operating pressure of the system also increases adsorption capacity per unit volume.

Increasing the cycle rate of a sorptive system requires decreasing the relative size of the adsorbent particle to increase the diffusion rate into and out of the adsorbent particle. Decreased particle size undesirably increases the rate and likelihood of co-adsorption of unwanted molecular moieties. Ultra-rapid cycle adsorption systems, therefore, require methods of preventing co-adsorption, or means of periodically regenerating or cleansing the adsorbent.

Liberation of the sorbed material from the sorbent (i.e. desorption) can occur via a number of different mechanisms. Conventional adsorption systems employ either pressure reduction or temperature increase for removal of the adsorbate. Systems swinging between adsorption and pressure differential desorption are known as pressure swing adsorption (PSA) systems. Alternatively, adsorption systems switching between adsorption and temperature differential desorption are known as temperature swing adsorption (TSA) systems. Other desorption mechanisms exist, including electrical energy desorption (for dielectric and/or conductive sorbents) and microwave irradiation of sorbent/adsorbate complexes.

Regardless of the adsorption/desorption process employed, these systems require that an energy balance be maintained in the system. That is, energy that is dissipated during adsorption (as heat) must be reintroduced into the system during desorption. The most efficient adsorption systems, in terms of energy, are those containing the least amount of superfluous mass because heating and cooling a large vessel, a large volume of sorbent, and associated binder materials during the repeating cycles is a very wasteful process. As a result, the current trend is toward lower mass, rapid cycle systems despite the fact that such measures have traditionally been associated with reducing volumetric efficiency.

Recent advances in the field of micro electromechanical systems (MEMS) research have led to proposals for incorporating micro-channel adsorption and reaction devices that provide for very short cycles with increased heat transfer capacities into traditional PSA and TSA systems. Such devices alternate the flow and pressure of complex compounds into and from sorbent filled micro-channels (thus increasing surface area with minimal effect on system size). For example, corrugated sheets have been impregnated or covered with thin layers of such sorbent materials. Additionally, such systems offer the possibility of exceedingly short cycle times on the order of tenths of seconds. Accordingly, it is envisioned that such devices would be particularly well suited for use in small devices, such as oxygen enrichment systems for hospital patients. However, these devices still require mechanical valving and compressors that may lead to mechanical failure and unwanted bulk.

Another method of separating and/or purifying includes membrane technology. Membranes function like filters in that they allow certain substances to pass through them while preventing others from passing through their pores and remain in the feed stream. Membranes are very basic in their operation and require no special valving, switching, or purging cycles. Membranes may function in a continuous manner. However, membranes provide no effective means for removing the substances trapped in their pores, they have a high power requirement, and they are limited in their selectivity. Also, membranes require high pressure differentials to effect diffusion and large surfaces because of low permeance per unit area. Membranes can also incorporate sorbent materials to improve selectivity. These types of membranes can be operated in a pressure swing manner, where the desorption portion of the cycle serves to clean the membrane pores of adsorbed material.

The need to decrease the size and mechanical complexity of adsorptive fluid separation and thermal lift devices is driven by economic concerns and by the need to integrate these devices into increasingly efficient and durable micro systems. For example:

Manned space platforms require environmental remediation apparatus of extremely low mass and high reliability. Current carbon dioxide removal systems require large quantities of sorbent material.

Hybrid-, electric-, and fuel cell-powered land vehicles will require non-mechanical solutions to meet cabin heating and cooling needs and will likely be powered by a 42-volt electrical system. Current thermal comfort systems rely on waste heat and mechanical energy that will not be available in future vehicle designs.

The use of fuel cells as power sources for automotive, generation of electricity, and portable electronics necessitates the development of small, lightweight fuel reformers, oxygen concentrators, and fuel purification devices. This need is currently supplied by membrane and pressure swing adsorption machinery that is both bulky and energy consumptive.

The use of oxygen enriched air for combustion processes in transportation, metal refining, and chemical processes, and in pollution abatement, agriculture, and aquaculture is being developed. The economic viability of these proposed systems enhancements requires that oxygen-nitrogen separation equipment be affordable, energy efficient, and, in the case of propulsion applications, able to meet mass-volume criteria.

The need to create temperature conditioned spaces for human habitation, food storage, and for sensitive equipment is increasing along with the expectations and living standards of the human population. This is applying tremendous strains on energy production capacity and material availability. Present mechanical thermal lift devices are material intensive, complicated, and use working fluids that contribute to the "greenhouse effect." Mechanical systems also have high starting currents requiring oversized electrical supply systems.

Industrial operations requiring separation technology to provide feed stocks utilize large scale pressure and temperature swing adsorption, distillation, and compressor driven membrane equipment that, because of "economy of scale" considerations, obviates the adoption of more efficient point-of-use manufacturing practices.

Some improvements have been made toward decreasing the cycle times of TSA and PSA systems. In one instance, a plurality of sorbent containing pressure vessels is held central to a continuously rotating valve assembly. This results in lower fluid residence time in the reactor vessel and higher throughput per unit volume of sorbent. In another instance micro reaction chambers are created by etching or otherwise forming linear channels on a substrate. The substrate is formed of or contains sorbent material. This allows for heat exchange between reaction channels and for short reaction times. Both of these configurations are vast improvements over existing pressure and temperature swing adsorption systems that rely on vessel size and operating pressure to increase capacity.

There is, however, a continuing and pressing need for methods and devices that are capable of selectively separating and/or purifying mixtures, particularly those that reduce cycle times even further, minimize or eliminate moving parts, valving, switching, and purging, and that may function continuously, and are lightweight and portable. There is also a need for devices and systems that are less expensive to build, less complicated to maintain, scalable, and energy efficient, especially for mobile and small-sized applications. Furthermore, there is a need for technology that enhances the sorption and desorption of these methods, systems, and devices to optimize their performance. In addition, there is a need to maintain the dryness of the adsorbent to optimize capacity. Methods are also needed that can recoup the considerable energy produced during the desorption phase of the cycle. The invention is directed to these, as well as other, important ends.

SUMMARY OF THE INVENTION

The methods, devices, and systems of the invention are major innovations and depart radically from conventional separation and temperature control technology. The invention utilizes sustainable technology and the devices and systems of the invention are compact, energy efficient themselves, and help other machines and devices use less energy and create less pollution. In certain embodiments, the methods, devices, and systems employ a reciprocating biaser inter alia, for separation and purification processes.

In one embodiment, the invention is directed to methods of separating components of a fluid mixture, comprising the steps of:

alternatingly providing a fluid mixture comprising a first component and a second component to a first unit and to at least one second unit;

wherein said a first unit comprises:

a first chamber;

at least one first inlet with a check valve for entry of said fluid mixture comprising said first component and said second component;

a first outlet for removal of said first component;

a first sorbent structure comprising an entrance, an exit, and a first sorbent for said first component; and an optional first thermal regenerator; and wherein said second unit comprises:

a second chamber;

at least one second inlet with a check valve for entry of a fluid mixture comprising a first component and a second component;

a second outlet with an optional check valve for removal of said first component;

a second sorbent structure comprising an entrance, an exit, and at least one second sorbent for said first component; and an optional second thermal regenerator; and increasing the pressure on said incoming fluid mixture in said first unit and sorbing at least a portion of said first component in said fluid mixture onto said first sorbent in said first unit and simultaneously decreasing the pressure in said second unit and desorbing any first component from said second sorbent in said second unit; and then decreasing the pressure on said fluid mixture in said first unit and desorbing said sorbed first component from said first sorbent in said first unit and simultaneously increasing the pressure on said incoming fluid mixture in said second unit and sorbing at least a portion of said first component onto said second sorbent in said second unit, thereby transferring desorption energy to said second unit.

In another embodiment, the invention is directed to methods of separating components of a fluid mixture, comprising the steps of:
providing a fluid mixture comprising a first component and a second component to a first unit;
wherein said first unit comprises:
a first chamber;
a first inlet with a check valve for entry of said fluid mixture comprising said first component and said second component;
a first outlet for removal of said first component;
a first sorbent structure comprising an entrance, an exit, and a first sorbent for said first component; and
an optional first thermal regenerator; and
increasing the pressure on said incoming fluid mixture in said first unit and sorbing at least a portion of said first component in said mixture onto said first sorbent in said first unit and simultaneously decreasing the pressure in at least one second unit comprising a chamber and an outlet; and
then decreasing the pressure on said fluid mixture in said first unit and desorbing said sorbed first component from said first sorbent in said first unit and simultaneously increasing the pressure on said fluid in said second unit, thereby transferring desorption energy to said second unit.

In other embodiments, the invention is directed to devices for separating a fluid mixture, comprising:
a first unit comprising:
a first chamber;
a first inlet with a check valve for entry of said fluid mixture comprising said first component and said second component;
a first outlet with an optional check valve for removal of said first component;
a first sorbent structure comprising an entrance, an exit, and a first sorbent for said first component; and
an optional first thermal regenerator;
at least one second unit comprising:
a second chamber;
a second inlet with a check valve for entry of a fluid; and
a second outlet with an optional check valve for removal of a fluid;
optionally, at least one thermoelectric temperature swing drying unit; and
a reciprocating biaser connected to said first chamber and said second chamber.

In yet other embodiments, the invention is directed to devices for separating a fluid mixture, comprising:
a first unit comprising:
a first chamber;
a first inlet with a check valve for entry of said fluid mixture comprising said first component and said second component;
a first outlet with an optional check valve for removal of said first component;
a first sorbent structure comprising an entrance, an exit, and a first sorbent for said first component; and
an optional first thermal regenerator;
at least one second unit, wherein each of said second units comprises:
a chamber;
an inlet with a check valve for entry of a fluid; and
an outlet with an optional check valve for removal of a fluid;
optionally, at least one thermoelectric temperature swing drying unit; and
a reciprocating biaser connected to said first chamber and to said chamber of each of said second units.

In other embodiments, the invention is directed to systems comprising at least one device described above.

In another embodiment, the invention is directed to portable medical oxygen generators, comprising:
at least one device described above;
wherein said device produces at least about one liter of oxygen per minute and weighs less than about 10 kg.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 12 is illustrates one example of applying, the Electromagnetic radiation (EMF) in such a manner that contaminates are desorbed while not introducing performance degrading heat into both contactors simultaneously, where arrows indicate EMF application periods.

DETAILED DESCRIPTION OF THE INVENTION

Figure 1:
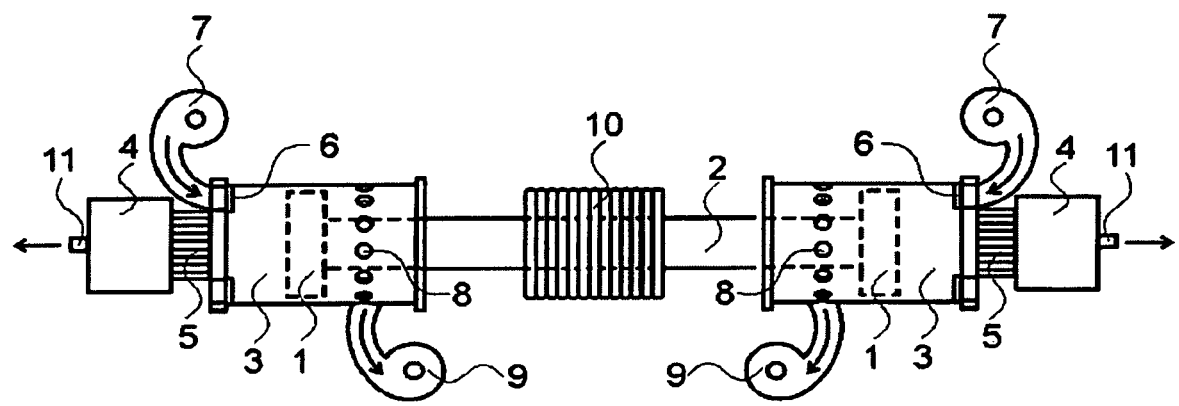
FIG. 1 illustrates a generalized representation of the component parts of an energy recuperative sorptive device in accordance with an embodiment of the invention, wherein the fluid mixture to be separated is air for the purpose of concentrating and/or purifying oxygen.

The invention relates to methods, devices, and systems capable of use in purification and/or separation processes for fluids. In particular, the below-described sorption (adsorption or absorption) system can be used for fine or bulk chemical separations of fluid, especially gaseous, materials. This reusable sorption (adsorption or absorption) system provides high efficiency purification and/or separation with low energy demands and preferably with minimal moving parts. The invention can function alone as single unit or multiplexed, used in parallel, or used in series with other similar such sorption units.

The invention provides sorbent methods, devices, and systems capable of continuous operation without large quantities of sorbent and/or complex valving requirements typically associated with such systems. In fact, the invention reduces the quantity of sorbent required to an absolute minimum relative to traditional swing sorption (adsorption or absorption) systems discussed above. Furthermore, the invention does not rely on large compressors or temperature differentials to operate and it has minimal moving parts. In addition, the invention uses minimal externally supplied desorption energy. The invention is also easily scalable; thus, it can be manufactured and used by simple duplication and selective arrangement of individually functioning and self-contained sorption (adsorption or absorption) modules.

The invention is capable of separating multiple or individual components from complex fluid mixtures. Additionally, the invention can readily be configured to function as a dehumidifying unit, or a sorptive heat pump.

Pressure, temperature, and electrical swing sorption (adsorption or absorption) systems generally rely on a heat rejection period so that the heat of sorption can be dissipated before the next sorption cycle. A variety of methods are used to cool the sorbent (sorbent or absorbent). The methods, devices, and systems of the invention are major innovations and depart radically from conventional separation and temperature control technology. The invention utilizes sustainable technology and the devices and systems of the invention are compact, energy efficient themselves, and help other machines and devices use less energy and create less pollution. In certain embodiments, the methods, devices, and systems employ a reciprocating biaser, inter alia, for separation and purification processes. In addition, the methods, devices, and systems directly couple the sorption process with the pressure generating mechanism, thereby removing the typical parasitic losses created by plumbing between the compressor and sorbent. The depressurization energy of one unit is directly transmitted via the reciprocating biaser, for example, to the concurrent sorption process of the other unit without the use of complicated mechanical linkages, such as those described in U.S. Pat. No. 6,641,644 and US 2005/014, 511.

Typical sorptive separation systems function at a fraction of their theoretical efficiency or exergetic efficiency due to irreversible losses of energy in the system, including frictional losses, parasitic losses (caused by plumbing and the like), thermal losses (from heats of compression) and compressive losses (from compressing the raffinate). A variety of techniques have been used to reduce these losses, including pressure equalization, raffinate energy recover (such as that described in US 2005/014,511), and friction reduction (using scroll compressor technology). Unfortunately, these solutions are expensive, complex, and capital intensive. The methods, devices, and systems of the invention overcome many of these shortcomings.

Definitions

The following definitions are provided for the full understanding of terms used in this specification.

As used herein, the article "a" means "at least one", unless the context in which the article is used clearly indicates otherwise.

As used herein, the terms "separation" and "separating" mean the act or process of isolating or extracting from or of becoming isolated from a mixture (a composition of two or more substances that are not chemically combined).

As used herein, the terms "purification" and "purifying" means the act or process of separating and removing from anything that which is impure or noxious, or heterogeneous or foreign to it.

As used herein, the term "fluid" refers to a continuous amorphous substance that tends to flow and to conform to the outline of its container, including a liquid or a gas, and specifically includes solutions (where solids dissolved in the liquid or gas) and suspensions (where solids are suspended in liquid or gas).

As used herein, the term "open system" refers to a system that is open and accessible to the outside environment.

As used herein, the term "closed system" refers to a system that is not open and accessible to the outside environment.

As used herein, the term "portable" refers to a device that may be capable of being carried or moved. Preferably, the term refers to a device that may be carried by an adult or child with little or no effort. However, the term also refers to a device that is not permanently affixed to a permanent structure and is of sufficiently low mass and bulk that it may be easily transported as part of a vehicle or transportation device.

As used herein, the term "chamber" refers to a three-dimensional volume having an generally solid outer surface that is generally elliptical or circular in cross-sectional shape. A chamber has an inner chamber where a piston, for example, can move.

The term "sorbent" or "sorbent contactor" refers to an adsorbent, absorbent, a membrane, or a membrane containing an adsorbent or an absorbent.

As used herein, the term "check valve" refers to a device that allows fluid to flow in one direction only.

As used herein, the term "biaser" refers to a member that is capable of movement (either physical via mechanical force or electrical via electric or electromagnetic field) and may include, for example, a unified elongated member or a bar, tube, or rod with a piston at each end to form a linear, double-acting, or spring-balance piston system.

As used herein with respect to the biaser, the term "reciprocating" refers to a member which is double acting and moves back and forth along the same line.

Figure 6:
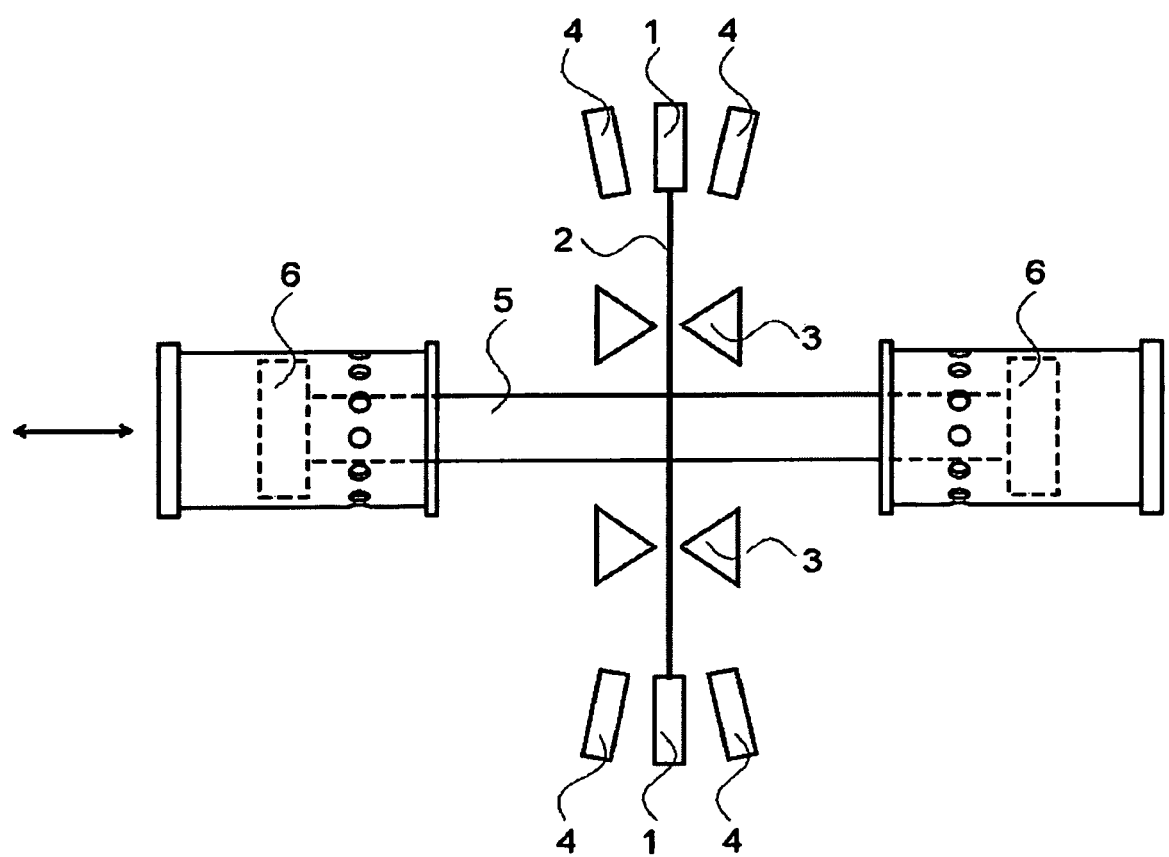
FIG. 6 illustrates a vibration balanced sorptive device using capacitive electrostatic, electromagnetic, electrodynamic, or piezoelectric actuators.

As used herein, "heat regenerator" means any device that can temporarily store heat, including, but not limited to a wire mesh connected to a material that rapidly conducts heat, such as diamond, ruby, copper, and aluminum, in a configuration that minimizes flow resistance and maximizes contact area, including devices typically used in Stirling cycle engines, such as illustrated in FIG. 6.

An important aspect of the methods, devices, and systems of the invention is that energy from the desorbing and decompressing fluid is substantially recovered rather than dissipated and wasted. The recovered energy is used to drive the second and opposing piston for other purposes, such as, for example, for further compression, or for further processing separating of the fluid mixture. Each iteration of the device uses heat of sorption to drive the process.

Reference will now be made in detail to the preferred embodiments of the invention, examples of which are illustrated in the drawings and the examples. This invention may, however, be embodied in many different forms and should not be construed as limited to the embodiments set forth herein. In addition and as will be appreciated by one of skill in the art, the invention may be embodied as a product, method, system or process.

In one embodiment, the invention is directed to methods of separating components of a fluid mixture, comprising the steps of:
  alternatingly providing a fluid mixture comprising a first component and a second component to a first unit and to at least one second unit;
  wherein said a first unit comprises:
  a first chamber;
    at least one first inlet with a check valve for entry of said fluid mixture comprising said first component and said second component;
    a first outlet with an optional check valve for removal of said first component;
    a first sorbent structure comprising an entrance, an exit, and a first sorbent for said first component; and
    an optional first thermal regenerator; and
  wherein said second unit comprises:
    a second chamber;
    at least one second inlet with a check valve for entry of said fluid mixture comprising said first component and said second component;
    a second outlet with an optional check valve for removal of said first component;
    a second sorbent structure comprising an entrance, an exit, and at least one second sorbent for said first component; and
    an optional second thermal regenerator; and
  increasing the pressure on said incoming fluid mixture in said first unit and sorbing at least a portion of said first component in said fluid mixture onto said first sorbent in said first unit and simultaneously decreasing the pressure in said second unit and desorbing any first component from said second sorbent in said second unit; and
  then decreasing the pressure on said fluid mixture in said first unit and desorbing said sorbed first component from said first sorbent in said first unit and simultaneously increasing the pressure on said incoming fluid mixture in said second unit and sorbing at least a portion of said first component onto said second sorbent in said second unit, thereby transferring desorption energy to said second unit.

In certain embodiments, the method may further comprise the step of exhausting said desorbed fluid enriched in said first component in said first unit. This product enriched in said at least one first component can be delivered to the second unit of the device, to another processing device that is the same or different from the first device, or to a patient, for example, where the product is oxygen-enriched air for medical use. For example, the second unit of the device could be, for example, the second stage of a two (or more) stage purification.

In certain embodiments, the method may further comprise the step of collecting the portion of said mixture not sorbed onto said first sorbent in said first unit to provide a product enriched in said at least one second component.

In certain embodiments, the method may further comprise the step of transporting the portion of said mixture not sorbed onto said first sorbent in said first unit to provide a product enriched in said at least one second component. This product enriched in said at least one second component can be delivered to the second unit of the device, to another processing device that is the same or different from the first device, or to a patient, for example, where the product is oxygen-enriched air for medical use.

In certain embodiments, the product fluid exiting from the sorbent structure of the first unit may pass into the second unit and either be further separated and/or compressed before leaving the second unit.

In another embodiment, the invention is directed to methods of separating components of a fluid mixture, comprising the steps of:
  providing a fluid mixture comprising a first component and a second component to a first unit;
  wherein said first unit comprises:
    a first chamber;
    a first inlet with a check valve for entry of said fluid mixture comprising said first component and said second component;
    a first outlet with an optional check valve for removal of said first component;
    a first sorbent structure comprising an entrance, an exit, and a first sorbent for said first component; and
    an optional first thermal regenerator; and
  increasing the pressure on said incoming fluid mixture in said first unit and sorbing at least a portion of said first component in said mixture onto said first sorbent in said first unit and simultaneously decreasing the pressure in at least one second unit comprising a chamber and an outlet; and
  then decreasing the pressure on said fluid mixture in said first unit and desorbing said sorbed first component from said first sorbent in said first unit and simultaneously increasing the pressure on said fluid in said second unit, thereby transferring desorption energy to said second unit.

In certain embodiments, the method may further the step of exhausting said desorbed fluid enriched in said first component in said first unit. In certain embodiments, the method may further the step of collecting said fluid in said second unit to provide a product enriched in said at least one second component.

The separation process can be either kinetic-based or equilibrium-based. As an example, a kinetic separation could use a carbon molecular sieve to adsorb methane and separate nitrogen as the product gas. Many gases and condensable gases can be separated (VOCs or refrigerants), as described more fully herein.

In other embodiments, the invention is directed to devices for separating a fluid mixture, comprising:
  a first unit comprising:
    a first chamber;
    a first inlet with a check valve for entry of said fluid mixture comprising said first component and said second component;
    a first outlet with an optional check valve for removal of said first component;
    a first sorbent structure comprising an entrance, an exit, and a first sorbent for said first component; and
    an optional first thermal regenerator;

at least one second unit comprising:
- a second chamber;
- a second inlet with a check valve for entry of a fluid; and
- a second outlet with an optional check valve for removal of a fluid; and
- a reciprocating biaser connected to said first chamber and said second chamber.

The second component passes through the sorbent structure and hence may be referred to as the "product," "product fluid," or "product component" at this stage. The first component is sorbed onto the sorbent in the sorbent structure and then desorbed and removed and hence may be referred to as the "exhaust," "exhaust fluid," or "exhaust component" as this stage. It should be noted that while the second component may termed be "exhaust" it does not mean that this component is necessarily undesirable or that it cannot be collected and used in the same way as the "product."

In other preferred embodiments, the invention is directed to devices for separating a fluid mixture, comprising:
- a first unit comprising:
  - a first chamber;
  - a first inlet with a check valve for entry of said fluid mixture comprising said first component and said second component;
  - a first outlet with an optional check valve for removal of said first component;
  - a first sorbent structure comprising an entrance, an exit, and a first sorbent for said first component; and
  - an optional first thermal regenerator;
  - at least one second unit, wherein each of said second units comprises:
  - a chamber;
  - an inlet with a check valve for entry of a fluid; and
  - an outlet with an optional check valve for removal of a fluid; and
  - a reciprocating biaser connected to said first chamber and to said chamber of
  - each of said second units.

Figure 13A:
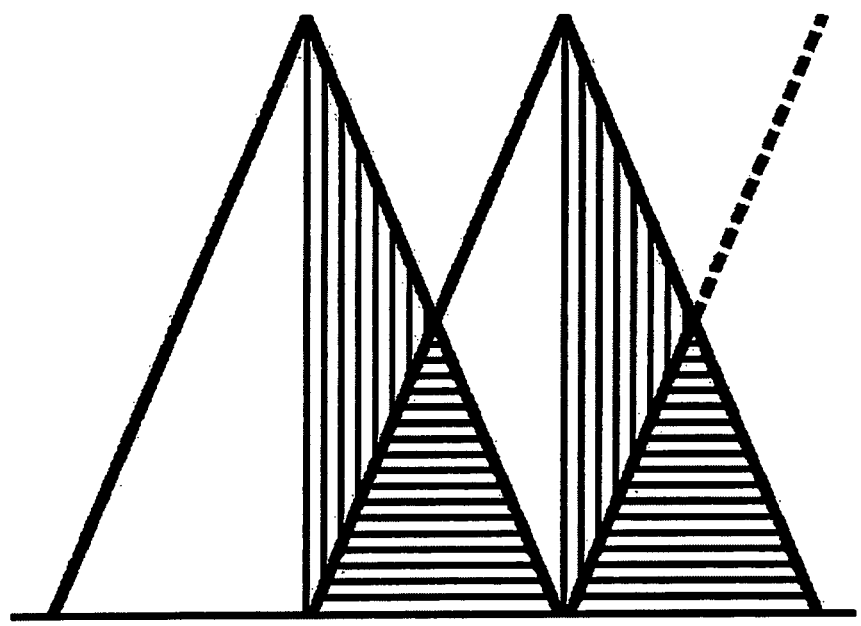
FIG. 13A is an idealized graph of a two-chamber system where vertical shading indicates energy that can be recouped via inertial means, and horizontal shading indicates energy that can be recouped via direct linkage of mechanical power transmission components.

Multiple chambers are preferable used to more evenly and effectively return desorption energy to the device. In certain embodiments, there may be a total of three chambers, four chambers, five chambers, six or more chambers. FIG. 13A shows two compression/adsorption chambers compared to FIG. 13B with four or more compression/adsorption chambers. It is preferable to have six or fewer chambers, as the performance of the system is not increased appreciably and the complexity increases. The optimum number of chambers is a balance between cost and performance. There may be an odd or even number of chambers.

Figure 14A:
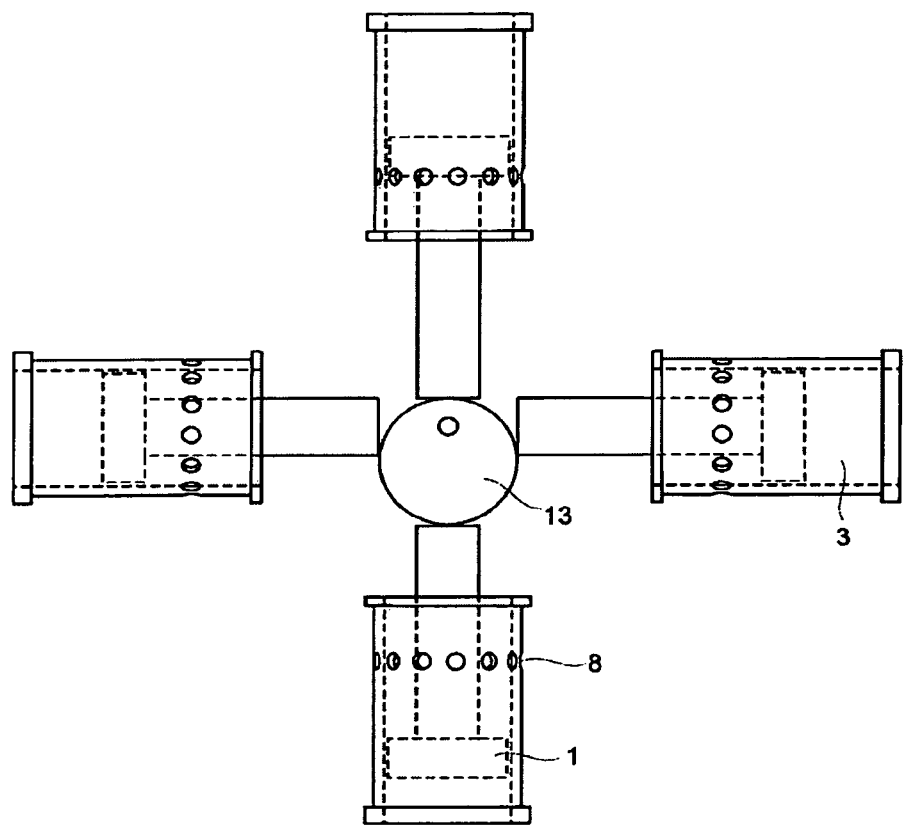
FIG. 14A illustrates a four-chamber system using an eccentric to deliver and recoup compressive energy.
Figure 14B:
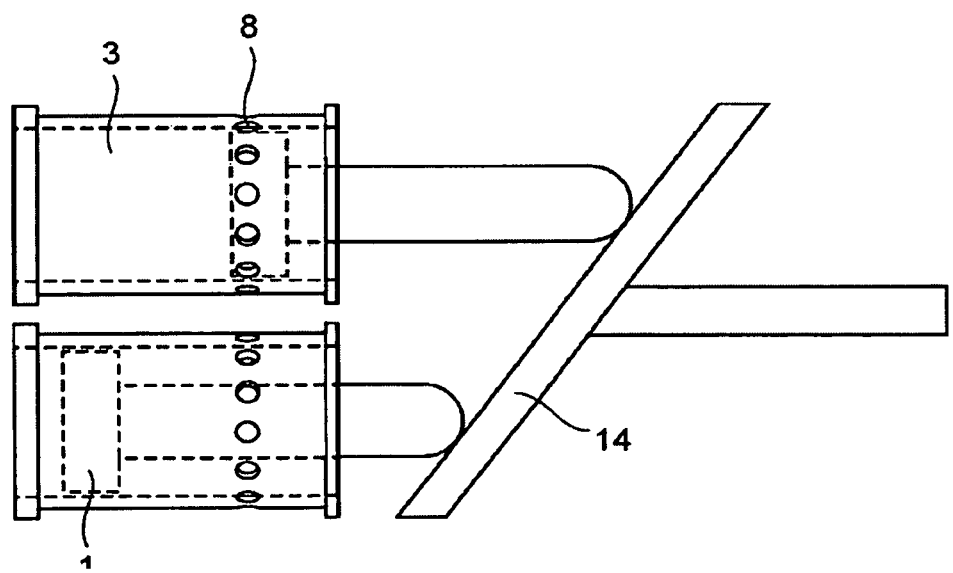
FIG. 14B illustrates how a multiple chamber system may be driven by a swash plate.

In certain preferred embodiments, the reciprocating biaser may be connected to said first chamber and to said chamber of each of said second units via a mechanical power transmission connection. Suitable mechanical power transmission connections include a scotch yoke, eccentric crankshaft as shown in FIG. 14A, or a swash plate as shown in FIG. 14B. In addition, a nutating disc, a wankel type compressor, or a sliding vane compressor may be used with their attendant mechanical connectivities.

In certain preferred embodiments, the reciprocating biaser may be connected to said first chamber and to said chamber of each of said second units via a mechanical power transmission connection with a momentum conserving device, preferably with an electrical storage device. Suitable mechanical power transmission connections include a scotch yoke, eccentric crankshaft as shown in FIG. 14A, or a swash plate as shown in FIG. 14B. Suitable momentum conserving devices include a flywheel and the like. Suitable electrical storage devices include a battery, capacitor, or the like.

In preferred embodiments, the devices of the invention further comprise a thermoelectric temperature swing drying unit. The drying unit will remove moisture from the sorbent structure.

In certain embodiments, the reciprocating biaser comprises:
- two opposing pistons;
- a power source to move said pistons in a reciprocating motion;
- an optional thruster rod;
- an optional servo motor (comprising a thruster coil);
- an optional polyphase power source;
- an optional amplifier; and
- an optional motor feedback controller.

The use of opposing pistons (also referred to as linear pistons) creates pressure differentials, which moves fluid in and out of each side of the device and to directly recoup decompression energy and deliver it to the other piston as compressive energy.

In certain embodiments, the devices of the invention can be connected in sequence to either further purify a fluid mixture or separate different components either from the product or exhaust stream.

In preferred embodiments, especially where the fluid mixture is air, a low pressure pump 7 is used to supply fresh incoming fluid mixture to the sorbent structure through at least one check valve 6, as shown in FIG. 1. This incoming fluid mixture purges the desorbed first component from the system through at least one outlet 8, as shown in FIG. 1. As can be seen in FIG. 1, in one embodiment of the device of the invention, pistons 1 are connected by thruster rod 2. The reciprocating movement of 1 and 2 creates alternating high and low pressures in cylinders 3. These alternating pressures in cylinders 3 create conditions amenable to adsorption and desorption in adsorbent contactors 4. Regenerators 5 absorb and emit thermal energy created by pressure changes and the sorptive process. Check valves 6 admit air to the system. A feed pump 7 may be used to boost the inlet pressure. Exhaust ports 8 vent the desorbed moiety when the piston is retracted. The exhaust ports may be connected to a vacuum pump 9 to lower the desorption pressure. Thruster coil 10 delivers energy to the system through thruster rod 2. The energy may be delivered by a variety of means (electrical, capacitive, piezo-electric, etc.). Check valves may be placed at the outlets of the adsorber contactors to prevent reverse flow back into the system. The residual pressure from the desorbing gas assists the thruster coil in delivering energy to the adsorbing piston and cylinders. Product exits system through product outlets 11.

Figure 2:
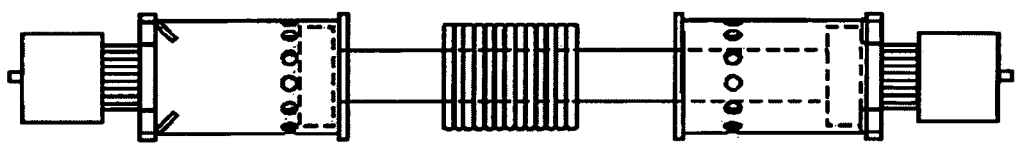
FIG. 2 illustrates the cycles of the energy recuperative sorptive device in accordance with an embodiment of the invention, wherein the fluid mixture to be separated is air for the purpose of concentrating and/or purifying oxygen.
Figure 2:
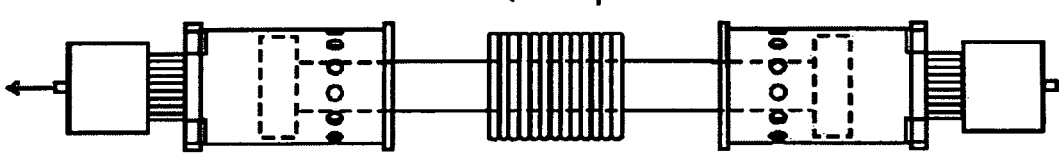
Figure 2:
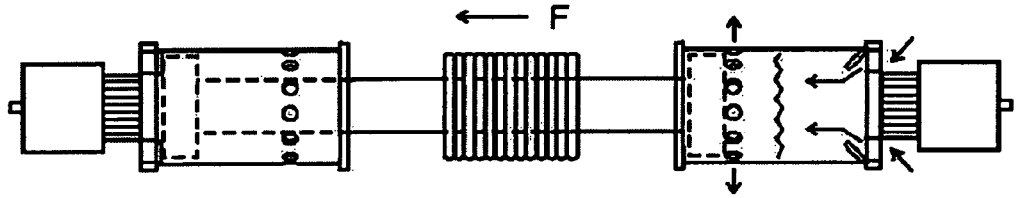
Figure 2:
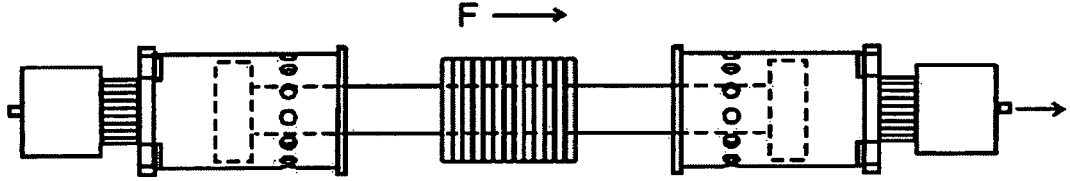
Figure 2:
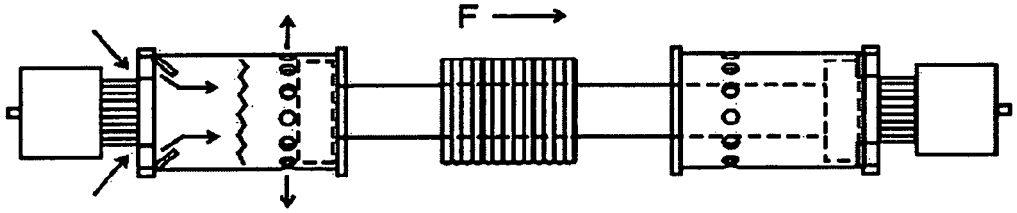

The operation of the device shown in FIG. 1 is shown in FIG. 2. The left chamber is filled with a complex fluid mixture (e.g., air). Thruster moves piston to the left, compressing the fluid mixture. One component (e.g., nitrogen) is adsorbed at the higher pressure. By virtue of the moving piston, the right side pressure is lowered, and desorption occurs. At the end of the stroke, the fluid mixture (e.g., air) displaces the desorbed sorbate (e.g., nitrogen). The direction of the thruster is reversed and compression and adsorption occurs at the right side cylinder and container. At the end of the stroke, the fluid mixture (e.g., air) enters on the left and displaced the desorbed sorbate (e.g., nitrogen).

In certain preferred embodiments, the at least one first inlet is adjacent the first sorbent structure.

In certain embodiments, the biaser is a physical biaser. In certain other embodiments, the biaser is an electric biaser.

Preferably, the optional thermal regenerator is positioned to cool the compressed fluid mixture before it enters the sorbent structure and to recoup the thermal energy as the first sorbed component is desorbed and exits the sorbent structure. This maintains a relatively low sorbent temperature (thereby increasing sorbent capacity) and allows the thermal energy normally lost to be recouped and made available as kinetic energy to drive the reciprocating biaser in the alternate compression cycle.

The thermal regenerator may be any material having good thermal transfer rates and capacity. Sintered brass, as used in fuel filters, is suitable. A honeycomb structure or drilled parallel passages are also suitable. The thermal regenerator is preferably designed to present the least amount of resistance to fluid flow.

A thermal regenerator may also be positioned after the sorbent structure where the second component not sorbed is flowing to help prevent temperature excursions that may limit performance.

The pistons may be, for example, made from fluorocarbon resins (such as those sold under the Teflon® trademark), graphitized carbon, metal, glass, plastic, or other materials and composites having natural or engineered lubricity, or a material that is shaped to create an air cushion or gas layer effect. Preferably, the linear piston has near zero side load forces, making it extremely friction free. The linear compression balances the momentum of the piston/thrust road assembly against the increase in chamber pressure as the piston approaches the end of the stroke. This allows the piston to decelerate and change direction using the least amount of energy.

Suitable power sources include any device that is capable of driving the reciprocating biaser and that is capable of operating on an electromagnetic, electrodynamic (Lorentz), or electrostatic principle. Suitable power sources include, for example, an actuator (such as a capacitive electrostatic actuator, electromagnetic actuator, electrodynamic actuator, or piezoelectric actuator, as shown in FIG. 6), battery (such as lithium ion, lithium polymer, or nickel metal hydride), fuel cell, stationary electrical power source, and earth field antenna. Energy may be added to the system at any point in the reciprocating cycle, but most preferably is added during that portion of the reciprocating stroke where the velocity is the greatest. Actuators operating on the electrostatic principle are preferred because they are generally lightweight (no copper or iron components are required), and may include electrets as part of their functional components.

The thruster coil may be made from, for example, copper, aluminum, semiconductor material or other suitable material having a high power density preferably with ease of fabrication. The servo motor is the combination of the thruster coil and the thruster rod. A thruster rod may contain rare earth magnets, capacitive elements, electrets, ferromagnetic core, piezo materials, or a mixture of materials having electrostatic and/or electromagnetic characteristics.

The polyphase power source may be a device that is an electrical system that uses or generates two or more alternating voltages of the same frequency but differing in phase angle. If the polyphase power source is present, the optional amplifier may be unnecessary.

The amplifier may be a device that takes a signal from a signal generator, arbitrary wave form generator, or microprocessor, and provide gain or an increase in current, voltage, or both without introducing noise. The amplifier may operate at relatively low voltages (12 to 240 volts) for electromagnetic operation or at very high voltages (in excess of 1000 volts) in the case of an electrostatic or electric field operation.

The motor feedback controller may be used to determine and control the position of the biaser, to control current draw, as a means for increasing or decreasing the output of the device (by alternating the piston stroke, for example), and/or as a means of controlling the velocity of the biaser so that the pressure applied to the sorbent chamber can be matched to the optimum sorption/desorption operating parameters.

In certain embodiments, the second unit further comprises a second sorbent structure comprising an entrance, an exit, and at least one second sorbent for said first component.

In certain embodiments, the at least one second inlet is adjacent the second sorbent structure.

In one preferred embodiment, the sorbent structure comprising an entrance, an exit, and at least one first sorbent for the first component, wherein the first sorbent is in the form of a plurality of contactors, preferably parallel passage contactors.

Contactors are passageways that permit movement of the fluid and put the fluid into contact with the sorbent that is either packed in the passageway or adhered to the walls of the passageway. The contactors are preferably formed by extrusion or a similar processing technique. Preferably, the contactors have parallel openings. The openings may be coating with sorbent, for example, by adhering with an adhesive, growing the sorbent onto the substrate, using electrostatic self-assembly techniques, adhering by using a calcining process, slurry coating a substrate material, or a combination of these techniques. The sorbent structure may then be shaped.

It is preferred that the shape of the sorbent structure is substantially conical, substantially polyhedronal base with triangular sides and a common vertex, substantially pyramidinal, substantially obeliskal, or substantially elliptical base. Preferably, the shape of the sorbent structure has a larger volume at the entry end and a smaller volume at the exit end because the volume of fluid decreases as the fluid enters the solid phase in each cycle. More preferably, the volume change of the fluid helps maintain the proper partial pressure relationship between the sorbate and the sorbent.

In certain embodiments, the second unit further comprises an optional thermal regenerator.

In certain embodiments, said first chamber and said second chamber have the same internal volume. In certain other embodiments, said first chamber has an internal volume that is greater than the internal volume of said second chamber. In certain other embodiments, said first chamber has an internal volume that is at least about twice as great as the internal volume of said second chamber. In certain embodiments, where a pressure increase is desired, the volume relationship should be similar to those that are used to achieve the maximum efficiencies in two stage air or gas compressors. In such cases, the compression ratios are kept below about 10:1. Also, a balance must be maintained to keep the amount of energy that must be injected into the system equal in both directions.

In certain embodiments, where the system is used to perform a two stage purification, or to remove two separate components from the fluid mixture, then the separate parameters (relative gas concentrations) will dictate the chamber dimensions.

In certain embodiments, said second inlet for entry of at least one fluid is an inlet for a fluid mixture comprising a first component and at least one second component. In other embodiments, said second inlet for entry of at least one fluid is an inlet for said at least one second component.

In certain embodiments, said second outlet for removal of at least one fluid is an outlet for removal of said at least one second component.

In certain embodiments, the device comprises an optional control system. For example, in certain embodiments, the reciprocating biaser may be controlled electronically, such as by an optical coupler, so that the biaser speed is matched to the sorption/desorption characteristics of the fluid mixture.

In normal use, the devices and systems of the invention may become fouled with undesirable sorbed materials, such as water from the humidity of the incoming air. In preferred embodiments of the methods, device, and systems of the invention, electromagnetic energy in the form of millimeter wave or microwave energy may be applied to the sorbent structure to desorb and remove the undesirable desorbed material. Because the application of the electromagnetic energy detrimentally increases the temperature of the sorbent structure and consumes power, it is preferred to minimize its application. In preferred methods, devices, and systems of the invention, the electromagnetic radiation is controlled by one or more of the following:

- applying the electromagnetic radiation alternatively between the first unit and second unit of the device;
- applying the electromagnetic radiation once per x number of reciprocation cycles based on water-fouling degradation curves of the particular sorbent used in the sorbent structure;
- use of about 1.5 to about 180 GHz frequency range;
- apply the electromagnetic radiation in a peristaltic fashion, such as the electric fields and electric currents used to effect desorption and electrokinetically biasing desorbed materials applied in International Publication No. WO 2005/081722, which is incorporated herein in its entirety by reference;
- select frequencies that minimize or eliminate heating of the sorbent but target the undesirable desorbed material, such as the water molecules.

In preferred embodiments, the electromagnetic radiation is applied at an interval to maintain the temperature of said first sorbent structure below a maximum of about 200° C. In certain other preferred embodiments, the electromagnetic radiation is applied alternately to said sorbent structure of said first unit and to said sorbent structure of said second unit at an interval to maintain the temperature of said first sorbent structure and said second sorbent structure below a maximum of about 200° C.

Figure 8:
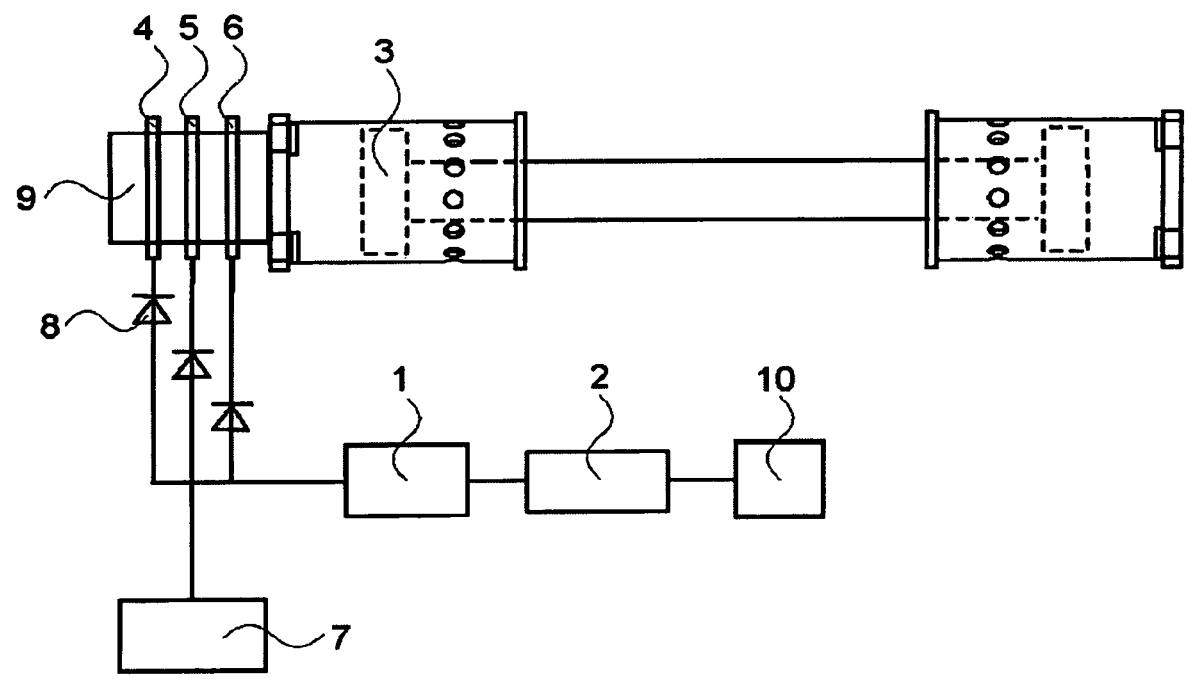
FIG. 8 illustrates the electronic components of the energy recuperative sorptive device when used in combination with a polyphase electrokinetically assisted desorption driver.

In certain preferred embodiments, the methods, devices, and systems of the invention use multiphase electric fields of millimeter wave and microwave energy with one or more antennae to create both desorption and a peristaltic effect to move the gas with the device or system. In another embodiment, one or more antennae deliver periodic millimeter wave or microwave energy into the sorbent to peristaltically remove water and other contaminants from the adsorbent bed, as shown in FIG. 8.

Electromagnetic radiation may alternately applied to adsorbent contactor A and adsorbent contactor B. FIG. 12 illustrates one example of applying the Electromagnetic radiation (EMF) in such a manner that contaminates are desorbed while not introducing performance degrading heat into both contactors simultaneously. In the worst case system performance is temporarily degraded by 50%. Arrows indicate EMF application periods.

The application of electromagnetic radiation may be regulated or operated in response to a signal from a detector that detects:

- the water content of the sorbent structure (such as by a conductivity sensor in the sorbent);
- environmental conditions (such as relative humidity);
- product purity measurements; and/or
- certain predetermined intervals.

The electronic control of the desorption energy keeps the alternate sorption beds below a temperature that would interfere with their ability to sorb.

Alternatively or additionally to the application of electromagnetic radiation described above, the device or the individual units may be kept substantially free of water by surrounding it with a water permeable material (such as a membrane or sorbent material). Since the sorbent structure is always averaging a positive pressure relative to atmospheric pressure, water will be biased out of the sorbent structure.

In certain embodiments, said fluid mixture is air. In certain embodiments, said first sorbent or second sorbent is a sorbent for nitrogen.

The rapid cycle methods, devices, and systems of the invention are more efficient both in terms of material usage and energy input because they approach the ideal of a non-cyclic, or continuous, sorption system.

In certain embodiments where the device has an appreciable mass and where the reciprocating biaser is operating at a frequency of about 1 to about 60 Hz, the device may preferably include vibration dampening. This vibration dampening can be accomplished, for example, via:

- the use of a spring loaded counter mass;
- a piston-in-cylinder configuration that may also serve as an auxiliary air, product, or exhaust mover where the product or exhaust can be delivered at a desired pressure, e.g., 5 psi oxygen for an aquaculture application by using the counter vibrating piston as an auxiliary compressor;
- a fluid in a container, where the fluid can be used as a counter vibrating mass to offset the vibration of the pistons;
- a pivoting driver that acts in a direction opposite to that of the thrust rod (as shown in FIG. 6); and
- combinations thereof.

In yet other embodiments, the invention is directed to systems, comprising at least one sorption (either adsorption or absorption) device described above.

The sorbent structure comprises at least one sorbent (either sorbent or absorbent). Almost all of the sorbents currently in use, and being developed, are suitable for inclusion into the architecture of the invention. Sorbents may be mixed or layered to enhance selectivity or afford a multiplicity of sorption mechanisms. Suitable sorbents for use in the methods, devices, and systems of the invention include, but are not limited to, is activated carbon, graphite, activated alumina, a molecular sieve, aluminophosphate material, silicoaluminophosphate material, zeolite, faujasite, clinoptilolite, mordenite, metal-exchanged silico-aluminophosphate, uni-polar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nanotube, nano-material, adsorbent metal salt (such as perchlorate and oxalate), alkaline earth metal metallic particles, ion exchange resin, linear polymers of glucose, polyacrylamide, or a combination thereof. The zeolite may be an ion exchanged metal zeolite, hydrophilic zeolite, hydrophobic zeolite, modified zeolites metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

Sorbent-sorbate reaction compounds should be selected from a three-dimensional matrix defined by the sorbent intoxicated electrical conductivity or permittivity or reactance, the thermal diffusion rate, and the mass diffusion rate.

Preferred sorbents are molecular sieves of the aluminophosphate and silicoaluminophosphate types, and metal substituted aluminophosphate and silicoaluminophosphate molecular sieves, as well as carbon and graphitic-based sorbents, especially as part of a polymer matrix.

The sorbent structure may further comprise at least one support. Preferably, at least a portion of the sorbent is adhered to or embedded in the support. Preferably, the support is a series of micro-channels, laminar, a porous electrode; a series of concentric layers, or a combination thereof.

In certain embodiments, the individual particles of the sorbent structure comprising the sorbent and support or sorbent alone (collectively referred to herein with respect to particles size as "sorbent") have a particle size of less than about 3,400 nm, preferably, less than about 340 nm, and more preferably, less than about 34 nm.

In certain embodiments, the sorbent structure is a form of a super crystalline lattice and the intracrystalline pore length of the super crystalline lattice is less than about 3,400 nm, preferably, less than about 340 nm, and more preferably, less than about 34 nm.

Suitable supports for use in the methods, devices, and systems of the invention include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof.

In certain preferred embodiments, each unit comprising sorbent structure may utilize different sorbents, wherein each of the sorbents is selective for a different component of the same or different mixture.

In certain preferred embodiments, the sorbent is activated carbon, graphite, activated alumina, a molecular sieve, aluminophosphate material, silicoaluminophosphate material, zeolite, faujasite, clinoptilolite, mordenite, metal-exchanged silico-aluminophosphate, uni-polar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nanotube, nano-material, adsorbent metal salt, alkaline earth metal metallic particles, ion exchange resin, linear polymers of glucose, polyacrylamide, or a combination thereof. The zeolite may be an ion exchanged metal zeolite, hydrophilic zeolite, hydrophobic zeolite, modified zeolites, metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

In certain preferred embodiments, the sorption and desorption times are controlled to maximize the retention and utilization of the heats of sorption.

As described above, the sorbent structure comprises at least one adsorbent or absorbent. Sorbents may be mixed or layered to enhance selectivity or afford a multiplicity of sorption mechanisms.

As described above, the sorbent structure may further comprise at least one support. Preferably, at least a portion of the sorbent is adhered to or embedded in the support.

Suitable supports for use in the methods, devices, and systems of the invention include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. Support resins for biological separations may be prepared from, for example, linear polymers of glucose, such as dextran and cellulose, and from synthetic gels such as polyacrylamide and hydroxyalkyl methacrylate. Bio-separations are usually based on ion exchange sorption, hydrophobic interactions, affinity interactions, immobilised metal ion sorption, and size exclusion filtration. Affinity interactions can be made bio-specific by attaching appropriate ligands to the support media. (Reference: Biochemical Separations CE4 *Adsorption and Chromatographic Separations* by John Hubble. www.bath.ac.uk/~cesjh/adsorb.htm)

The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof In certain preferred embodiments, sorbent structure comprises at least two different sorbents, wherein each of the sorbents is selective for a different component of the mixture.

The device may also comprise:
  a source of a fluid mixture comprising at least a first component and a second component;
  a collector of said first component;
  a collector of an exhaust fluid stream enriched in said second component and depleted in said first component;
  an fluid induction unit.
  a data collection component;
  a user interface component; and/or
  a vacuum unit.

The sorption device may be open or closed to the outside atmosphere.

The sorption device may further comprise valves, including mechanical check valves, Tesla valves, and pneumatic diode valves, although additional valves are not preferred.

The sorption device may comprise one or more channels through which said fluid mixture flows. Preferably, the sorption device comprises a plurality of micro-channels through which said fluid mixture flows. The channel(s) may comprise the sorbent structure, or the sorbent may be adhered to the micro-channels The sorption device may have a two-dimensional or three-dimensional shape or arrangement selected from the group consisting of: circular, square, rectangular, triangular, hexagonal, chevron-shaped, octagonal, and in interleaved linear, honeycombed, parallel piped, spiral, polyhedral, and geodesic arrangements.

The methods, devices, and systems of the invention may be microprocessor controlled. The sorption devices of the invention may comprise at least one power conditioning device. Suitable power conditioning devices include a voltage changing device (such as a piezoelectric transformer or a high frequency transformer). a poly-phase frequency generator, a poly-phase frequency amplifier (a power transistor, a complimentary metal oxide semiconductor (CMOS), an insulated gate bipolar transistor (IGBT)), or a combination thereof.

When the devices and systems of the invention are used for concentrating oxygen for medical use, the devices and systems will preferably be small enough in size and weight to be easily carried by an elderly person or an individual with compromised health. The devices or systems may be supported by a purse-like or "fanny pack"-type holder with a shoulder strap.

When used for supplying medical oxygen, the device may further comprise a cannula and an optional conserver. The cannula may be held by, contained in, or hidden by the shoulder strap described above. The conserver may used that senses inspiration and that either opens a valve admitting oxygen to the cannula, or the sensor controls the cycle time of the reciprocating biaser.

In certain embodiments, the device may optionally comprise a vacuum blower to help remove the desorbed first component, such as nitrogen-enriched exhaust fluid.

Systems of the invention comprise at least one sorption device of the invention.

The system may comprise a plurality of sorption devices, including systems where at least some of said plurality of sorption devices are connected in series or in parallel. In certain embodiments, at least some of said plurality of sorption devices is located coplanar. In some embodiments, the edges of at least some of said plurality of sorption devices are contiguous. The sorption devices may also be stacked. In certain embodiments, at least some of said plurality of sorption devices comprises different sorbent structures.

Because the device and system of the invention admit the incoming fluid mixture and reject the outgoing exhaust fluid at nearly atmospheric pressure, they are quiet, preferably less than about 30 decibels. This is especially important in portable concentrator devices for producing medical oxygen, where the devices preferably weigh less than about 10 kg and/or produces at least about one liter of oxygen per minute, preferably at least about two liters of oxygen per minute.

There are a number of mixtures that may be separated into their component parts or purifying to remove unwanted components. Among the mixtures that may be separated by the methods, devices, and systems of the invention include:
air
to separate oxygen, nitrogen, argon, and/or carbon dioxide; and/or
to remove water, volatile organic compounds (including aromatic hydrocarbon compounds, such as benzene, cumene, xylene, toluene, and styrene; alkanes such as butane; cycloalkanes; halogenated hydrocarbons such as trichloroethylene, methylene chloride, and Freon; alcohols; esters; aldehydes such as formaldehyde; ketones; ethers; glycol ethers; amides; phenols; or a mixture thereof. and the like); indoor air pollution (including formaldehyde, ammonia, and carbon dioxide); airborne biological toxins (such as a virus, a bacterium, a fungus, a mycotoxin (T2), a satratoxin (H), a trichothecene mycotoxin, an aflatoxin, ricin, and the like and combinations thereof), radioactive material (such as radon, thoron, actinon, krypton, deuterium, tritium, carbon-11, nitrogen-13, fluorine-18, iodine-123, iodine-125, technetium-99m, technetium-95, indium-111, copper-62, copper-64, gallium-67, gallium-68, xenon, mercury, strontium-90, cesium-137 and the like and combinations thereof), and the like.

semiconductor fabrication process exhaust;

combustion exhaust (such as vehicle exhaust or boiler exhaust to remove carbon monoxide, an oxide of nitrogen, sulfur dioxide, and/or ozone);

an aqueous mixture
to remove volatile organic compounds (including aromatic hydrocarbon compounds, such as benzene, cumene, xylene, toluene, and styrene; alkanes such as butane; cycloalkanes; halogenated hydrocarbons such as trichloroethylene, methylene chloride, and Freon; alcohols; esters; aldehydes such as formaldehyde; ketones; ethers; glycol ethers; amides; phenols; or a mixture thereof); indoor air pollution (including formaldehyde, ammonia, and carbon dioxide); waterborne biological toxins (such as a virus, a bacterium, a fungus, a mycotoxin (T2), a satratoxin (H), a trichothecene mycotoxin, an aflatoxin, ricin, and the like, and combinations thereof), radioactive material (such as radon, thoron, actinon, krypton, deuterium, tritium, carbon-11, nitrogen-13, fluorine-18, iodine-123, iodine-125, technetium-99m, technetium-95, indium-111, copper-62, copper-64, gallium-67, gallium-68, xenon, mercury, strontium-90, cesium-137, and the like, and combinations thereof), heavy metals (such as mercury, chromium, cadmium, arsenic, lead, copper, uranium, plutonium, thorium, aluminum, zinc, silver, cobalt, and the like or a combination thereof), water-soluble salts (such as sodium salt, potassium salt, calcium salt, magnesium salt, barium salt, strontium salt, arsenic salt, nitrates, nitrides, iron hydroxide, and the like).

vaporized catalyst from, for example, a foundry cold box (such as sulphonic acid of an aromatic hydrocarbon selected from the group consisting of benzene, toluene, xylene, styrene, and cumene).

glycol from, for example, process vents at glycol dehydration stems in oil and natural gas production facilities mixtures of air, natural gas, liquid propane, inert gas, organic solvent, unsaturated hydrocarbon gas, and the like with water;

natural gas to remove any natural gas liquid or condensate, including, but not limited to, methane, water, carbon dioxide, nitrogen, hydrogen sulfide, or a mercaptan;

mixture of a linear alkane, a branched alkane, or a cyclic alkane to separate each type of alkane; and landfill emissions to remove methane and/or carbon dioxide.

Bodily fluids may be sorbed and manipulated with electrokinetic forces. For instance, a protein, such as bovine serum albumin (BSA), may be adsorbed onto the surface of 1 μm polystyrene microspheres. Sorption may be enhanced by manipulating the pH of the fluid. Precursor materials can be adsorbed to provide sites for other poorly adsorbed materials, i.e., goat antimouse polyclonal antibodies (PoAb) can be attached to microspheres to assist the capture of monoclonal antibodies (MoAb).

Using the methods, systems, and devices of the invention, artificial organs may be built whose function is to remove certain moieties from bodily fluids, liquids, or gases. Alternatively, toxins generated by disease, allergic reaction, or poisoning, or as byproducts of therapy could be removed on an "as-needed" or continuous basis by a surgically implanted or external device. Furthermore, the methods, systems, and devices of the invention may be used to remove respiration products from blood.

Support resins for biological separations may be prepared from, for example, linear polymers of glucose, such as dextran and cellulose, and from synthetic gels such as polyacrylamide and hydroxyalkyl methacrylate. Separations are usually based on ion exchange sorption, hydrophobic interactions, affinity interactions, immobilised metal ion sorption, and size exclusion filtration. Affinity interactions can be made bio-specific by attaching appropriate ligands to the support media. (Reference: Biochemical Separations CE4 *Adsorption and Chromatographic Separations* by John Hubble. www.bath.ac.uk/~cesjh/adsorb.htm).

In preferred embodiments, the methods of the invention may be used to concentrate undesirable waste products, such as radioactive waste products, thereby creating smaller quantities of waste products that must be disposed (both disposable materials and materials by which the waste is concentrated).

In certain embodiments, the invention is directed to inanimate organs for carrying out a bodily function in a patient in need thereof, comprising:
the sorption device of the invention;
wherein the bodily function is selected from the group consisting of:
removing toxins from blood;
removing toxins from respired air;
and combinations thereof.
With respect to the inanimate organ, the sorption device may be implanted in the patient or external to the patient.

In certain embodiments, the invention is directed to a dehydration device comprising the sorption device of the invention.

In certain embodiments, the invention is directed to a deodorizing device comprising the sorption device of the invention.

In certain embodiments, the invention is directed to an oxygen generating or purifying device comprising the sorption device of the invention, particularly one that is portable, such as those utilized in medical applications. In preferred embodiments, the invention is directed to portable medical oxygen generators, comprising:
at least one device described above;
wherein said device produces at least about one liter of oxygen per minute, preferably at least about two liters of oxygen per minute, more preferably at least about five liters of oxygen per minutes; and
wherein the device weighs less than about 10 kg, preferably less than about 5 kg, and more preferably less than about 2 kg.

In certain embodiments, the invention is directed to a vehicle comprising the sorption device of the invention. Suitable vehicles include an aerospace vehicle, an underwater vehicle, a land vehicle (including those powered by hybrid power, electric power, or fuel cell power). In certain embodiments, the invention is directed to a device for purifying air in the internal environment of a vehicle comprising the sorption device of the invention. In certain embodiments, the invention is directed to a device for purifying water in the internal environment of a vehicle comprising the sorption device of the invention. In certain embodiments, the invention is directed to a device for cooling the internal environment of a vehicle comprising the sorption device of the invention.

In certain embodiments, the invention is directed to a fuel reformer comprising the sorption device of the invention, such as a methanol reformer or a methane reformer.

In certain embodiments, the invention is directed to a fuel purification device comprising the sorption device of the invention.

In certain embodiments, the invention is directed to a combustion device comprising the sorption device of the invention. The combustion device may be a furnace, including those that are coal-burning or natural gas-burning electrical power generators, or a residential or institutional furnace.

In certain embodiments, the invention is directed to a fuel cell comprising the sorption device of the invention.

In certain embodiments, the invention is directed to a device for purifying exhaust of a vehicle comprising the sorption device of the invention.

In certain embodiments, the invention is directed to a device for pollution abatement comprising the sorption device of the invention.

In certain embodiments, the invention is directed to a device for temperature conditioning spaces for human or animal habitation or food storage comprising the sorption device of the invention.

In certain embodiments, the invention is directed to a concentrator for an analytical device comprising the sorption device of the invention. In certain embodiments, the invention is directed to an analytical device comprising the sorption device of the invention, such as a flame detector, mass spectrometer, infrared spectrometer, Raman spectrometer, ultraviolet spectrometer, visible light spectrometer, nuclear magnetic resonance spectrometer, gas chromatograph, liquid chromatograph, atomic adsorption spectrometer, potentiometer, spectrophotometer, or a combination thereof.

In certain embodiments, the invention is directed to an oxygen source, generator, or enrichment device, for such applications as coal conversion, power generation system, or for a fuel cell, comprising the sorption device of the invention.

In certain embodiments, the invention is directed to a nitrogen source, generator, or enrichment device, such as for providing an inert environment or other purpose, comprising the sorption device of the invention.

In certain embodiments, the invention is directed to an ozone source, generator, or enrichment device, comprising the sorption device of the invention.

In certain embodiments, the invention is directed to a dual oxygen and nitrogen source, generator, or enrichment device, comprising the sorption device of the invention.

Figure 15:
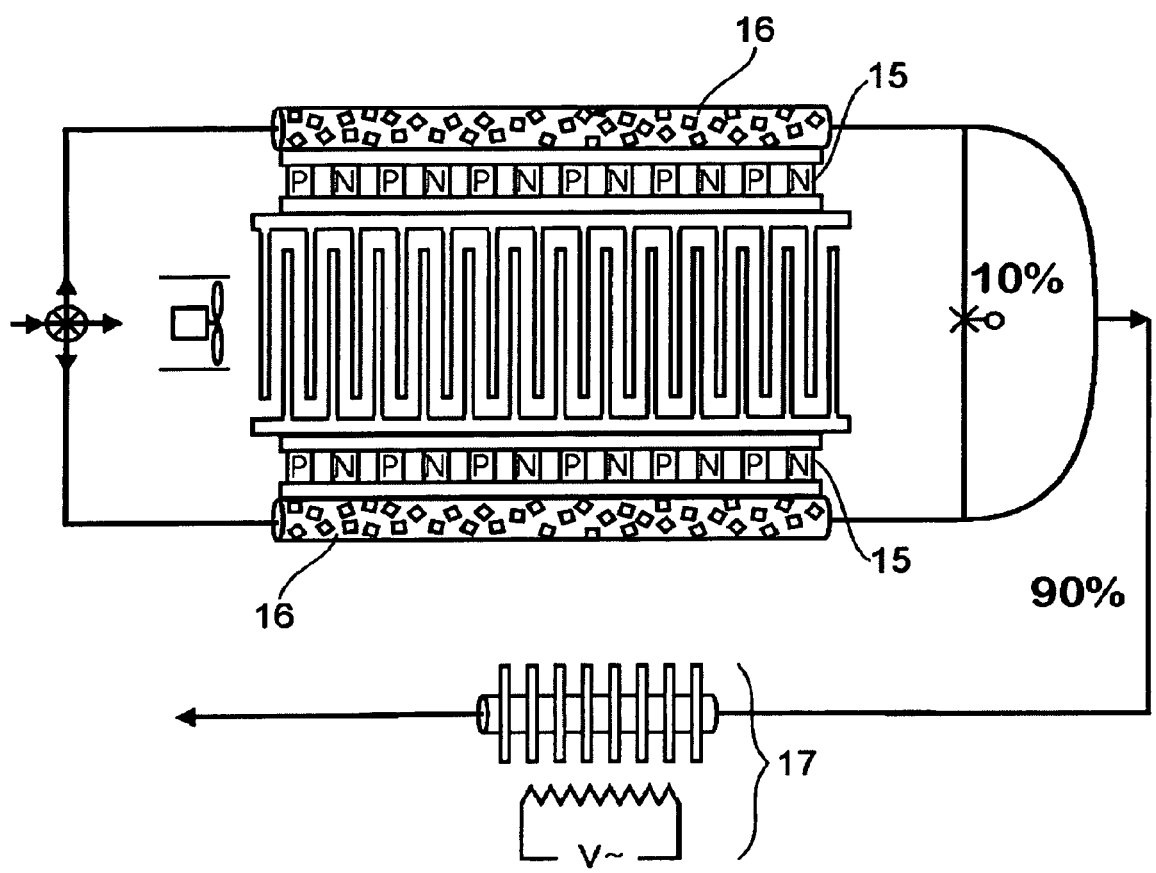
FIG. 15 illustrates a thermoelectrically driven temperature swing gas dryer that provides hot dry gas for adsorbent regeneration purposes. The dryer is operated periodically or during periods of system inactivity to maintain system adsorbent performance.

In certain embodiments, the invention is directed to Peltier device for water management, comprising the sorption device of the invention, as example of which is shown in FIG. 15.

It will be apparent to those skilled in the art that various modifications and variations can be made in the present invention and specific examples provided herein without departing from the spirit or scope of the invention. Thus, it is intended that the present invention cover the modifications and variations of this invention that come within the scope of any claims and their equivalents.

EXAMPLES

The present invention is further defined in the following Examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

Example 1

A laboratory bench scale test device utilizes a electrodynamic thruster (FIG. 1-1) two opposed aluminum cylinders (FIG. 1-3), two adsorbent contactors (FIG. 1-4) and a motion controller with Hall effect feedback. The thruster produces a 2 cm amplitude 10 cycle/second stroke. Pressure sensors located in cylinders indicate the pressure develops at each point in the cycle. The contactors (FIG. 1-4) contain about 30 mesh calcium exchanged zeolite (ZeoChem) spherical beads. Teflon™ pistons (31 mm diameter) are affixed to opposing ends of the thruster rod. Oxygen production is recorded for various cycle rates and amplitudes. Power consumption is computed as V×I.

Example 2

The sorptive device may be configured to produce a high pressure product such as may be needed for coal gasification, metal cutting, or aquaculture applications. In this case, a first cylinder and piston is used to alternately adsorb and desorb a fluid component. A second piston and cylinder, having a much smaller cross section is used to compress the product or the raffinate from the first cylinder. The force to drive the second piston is taken, in part, from the expanding desorbing fluid acting on the first piston, which is directly connected in a linear manner to the second piston.

Example 3

Figure 3:
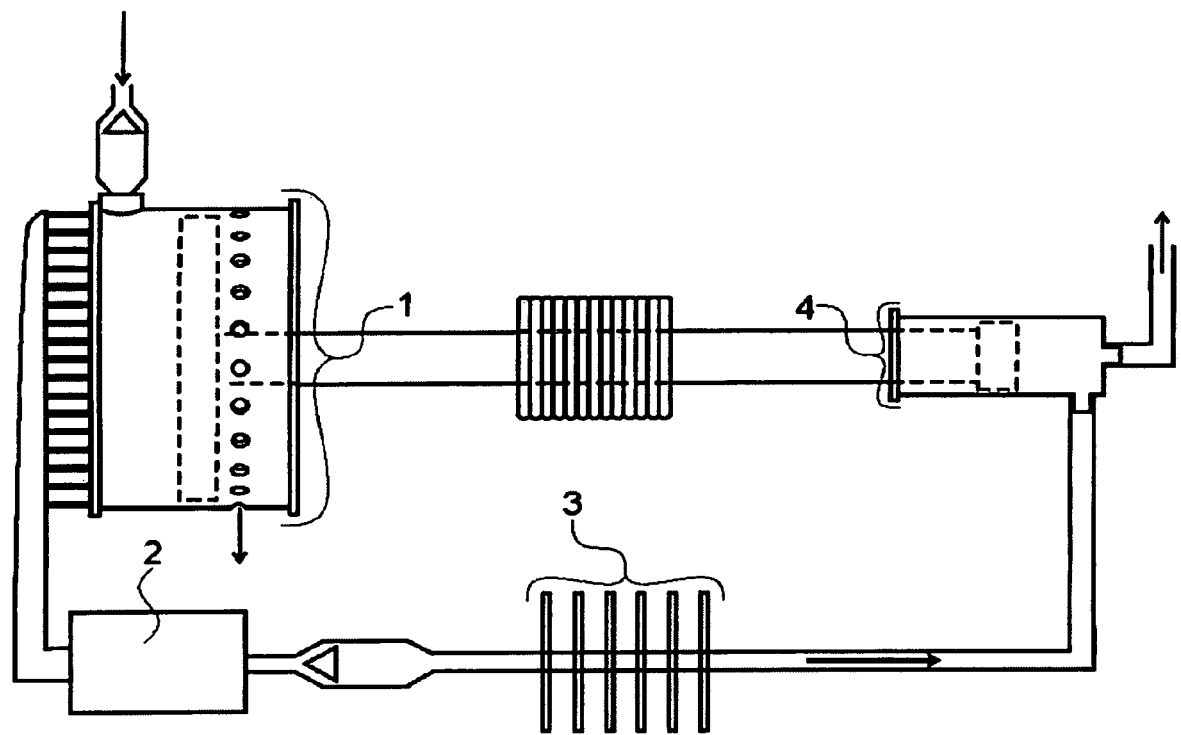
FIG. 3 is a generalized representation of the component parts of a high-pressure sorptive device in accordance with an embodiment of the invention, wherein the fluid mixture to be separated is air for the purpose of concentrating and/or purifying oxygen.

FIG. 3 illustrates a combination gas separation unit and booster compressor. Piston-cylinder arrangement 1 delivers alternating high and low pressures to adsorbent contactor 2. Gas purification occurs as described for FIG. 2 cycle. Purified gas is cooled in the heat rejection unit 3 and is delivered to booster compressor 4. Booster compressor 4 uses waste energy from the desorbed gas at 1.

Example 4

Figure 4:
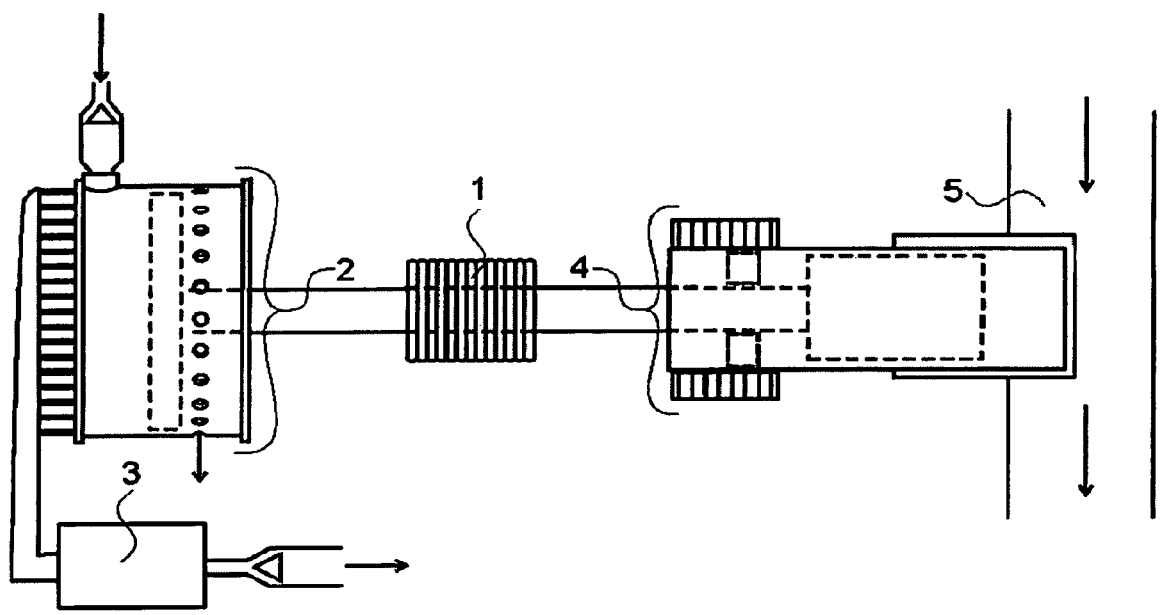
FIG. 4 is a generalized representation of a sorptive separation device that utilizes waste heat to produce oxygen.

FIG. 4 illustrates a Stirling engine-assisted gas separation unit. Thruster 1, piston-cylinder 2 and adsorbent contactor 3 produce a purified gas, i.e., oxygen for a combustion process. Stirling engine 4 is powered by the waste heat from a combustion process, which is delivered through plenum 5. Desorption energy delivered at 2 powers the compression stroke of Stirling engine 4.

Example 5

Figure 5:
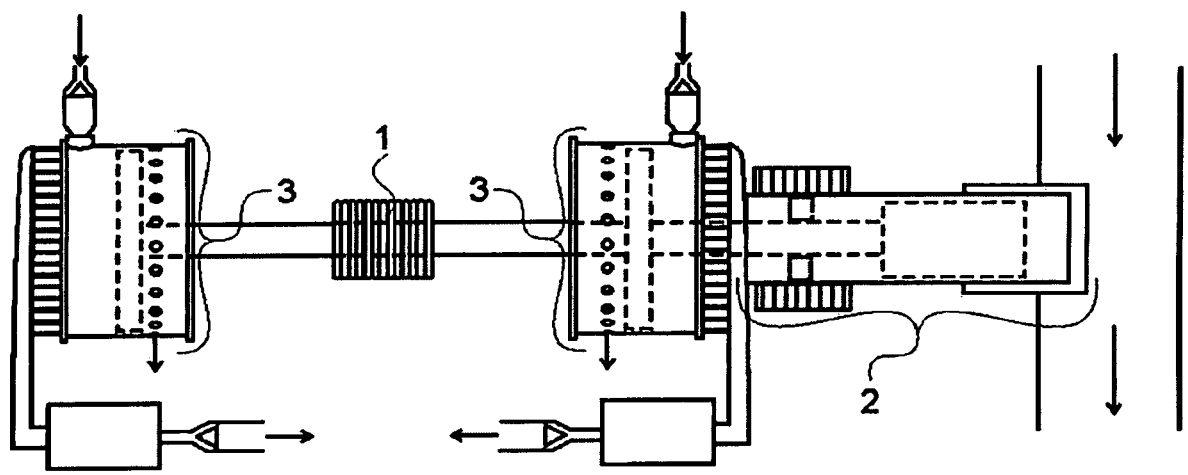
FIG. 5 is another embodiment of the device shown in FIG. 4.

FIG. 5 illustrates a variation of the Stirling engine-assisted gas separation unit shown in FIG. 4. Thruster 1 and Stirling engine 2 deliver energy to the opposed linear piston gas separations piston-cylinder arrangement 3.

Example 6

As shown in FIG. 6, reactive elements 1 are connected to the periphery of a flexural element 2. Pivots 3 act as fulcrums to change the direction of motion of the exterior and interior parts of the flexural element. Forces imposed by capacitive, electrostatic, electromagnetic, electrodynamic, or piezoelectric element 4 on reactive element 1 are transmitted to thrust rod 5 in an opposing direction. When the masses and velocities of the reactive element 1, thrust rod 5, and piston 6 are balanced, vibration is reduced or eliminated.

Example 7

Figure 7:
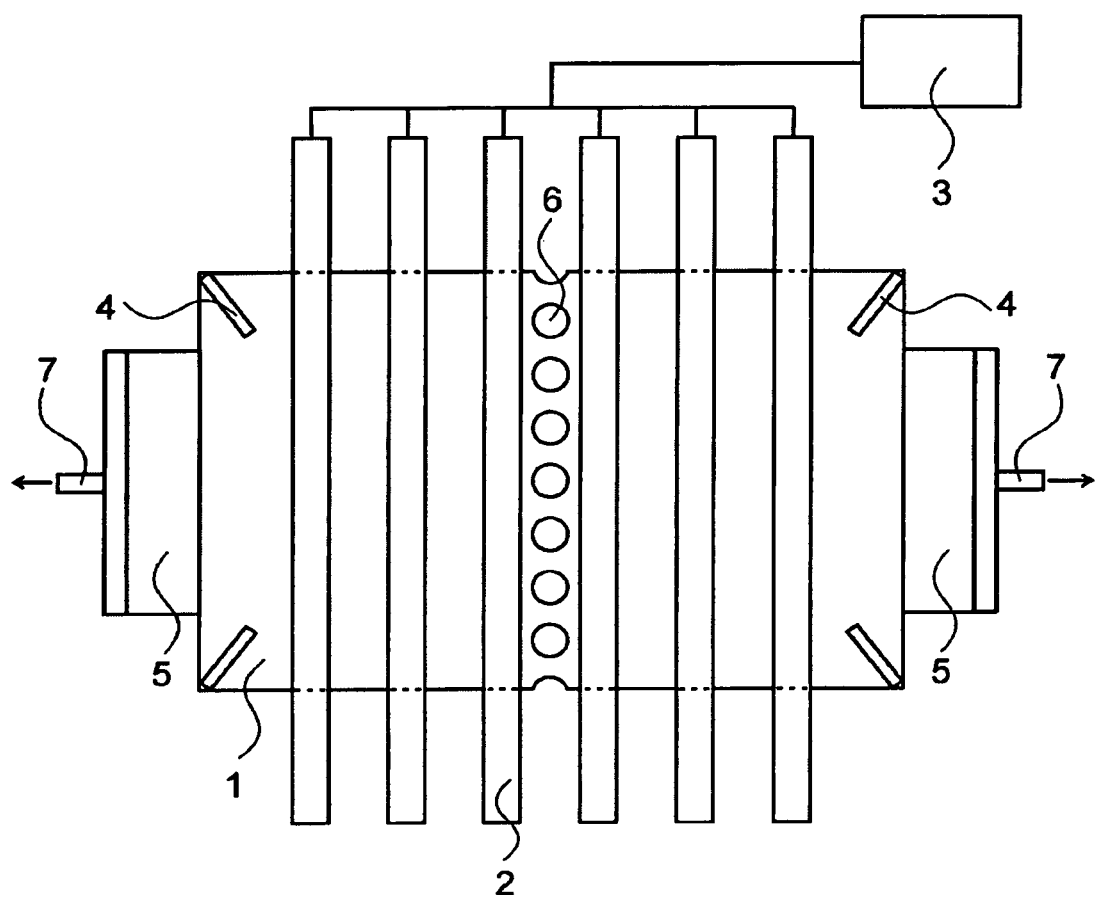
FIG. 7 is a generalized representation of an electrokinetically driven energy recuperative sorptive device.

As shown in FIG. 7, a chamber 1 is surrounded by field electrodes 2, which are energized by polyphase high voltage supply 3. The sequence of phasing of the electrodes is alternated from left to right and back again at a frequency that matches the natural harmonic of the chamber 1. This electrokinetically accelerates the fluid in chamber 1 back and forth creating alternating high and low pressure regions in the right and left side of the chamber. These alternating pressures induce the flow of fluid into the chamber through inlet valves 4, and out of the chamber at adsorbate contactor 5. When the phasing of the electrodes is from left to right, the left contactor 5 is desorbing and the right contactor is adsorbing. At the same time, the left side inlet valve 4 is admitting fresh fluid, and the raffinate ports 6 are exhausting the desorbed moiety. On the right side a higher pressure is causing adsorption at 5 and product exits at product outlet 7. When phasing reverses, the operations switch sides.

Example 8

As shown in FIG. 8, A millimeter to microwave generator 1 is connected to antennae 4, 5, 6 through PIN diodes 8. When piston 3 moves to the right, low pressure causes desorption in contactor 9. Phase generator 7 cycles the output of generator 1 to antennae 4, 5, 6, creating an electric and/or electromagnetic field that acts on the desorbing fluid in a peristaltic manner, assisting the fluid flow out of the adsorbent contactor 9. The fluxuating energy fields can also assist the desorption of certain adsorbed species, i.e., water. The cycle time coordinator 2 connects power source 10 to microwave generator 1.

Example 9

Figure 9:
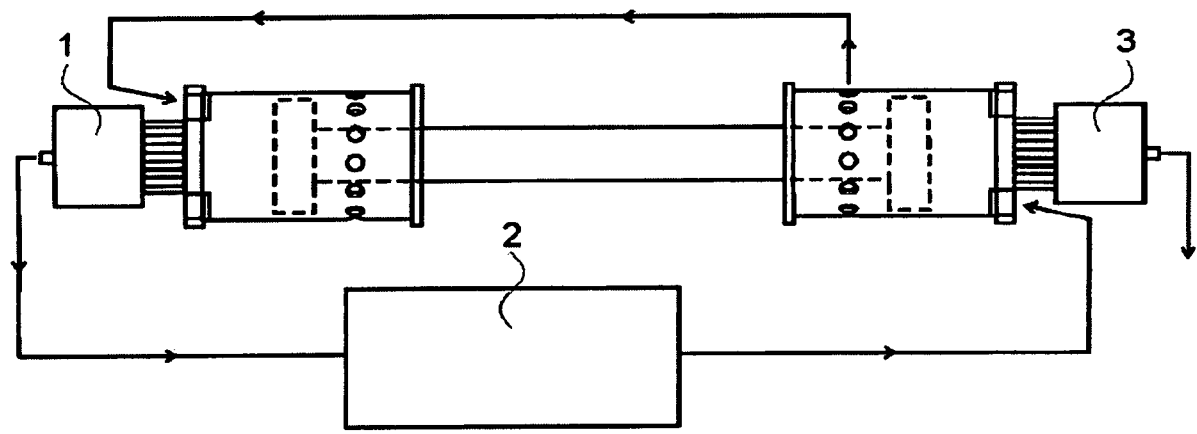
FIG. 9 illustrates an embodiment of the device as an oxygen enrichment, ozone producer, and ozone enrichment system

When used as an ozone generator, the device can use two different adsorbents, as shown in FIG. 9. For example, the first adsorbent, a 13× lithium exchanged zeolite 1, is used to produce an oxygen enriched flow which is directed to a dielectric barrier discharge reactor 2, where a portion of the oxygen ($O_2$) is converted to ozone ($O_3$). The $O_2$—$O_3$ stream is directed to adsorber 3, which contains a high silica zeolite suitable for $O_2$—$O_3$ separation. The product of adsorbent 3 is a highly enriched $O_3$ stream. The waste stream from adsorbent 3 contains $O_2$ and is directed back to the inlet of adsorber 1 for reprocessing.

Example 10

Figure 10:
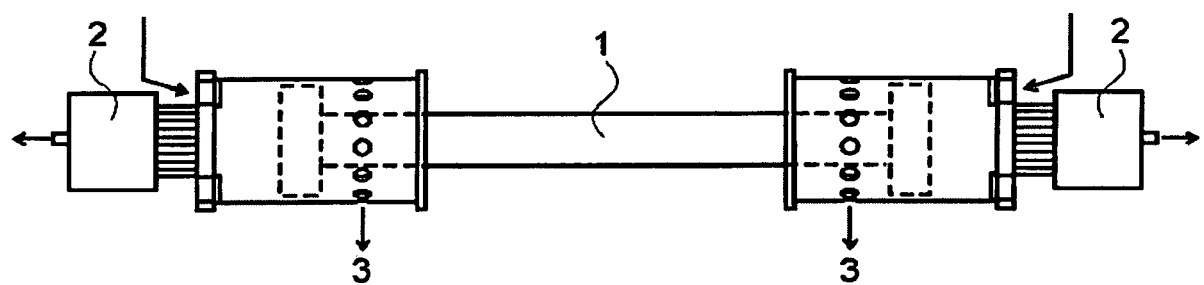
FIG. 10 illustrates an embodiment of the device as a combined enriched oxygen and nitrogen generator.

FIG. 10 illustrates a sorptive separations system configured for the production of two medium purity products. Thruster/piston assembly 1 delivers air to adsorbent contactors 2 containing carbon molecular sieve material, which adsorbs oxygen and produces a medium purity nitrogen product. The desorbed waste gas exits at raffinate outlet ports 3 and consists of medium purity oxygen.

Example 11

Figure 11:
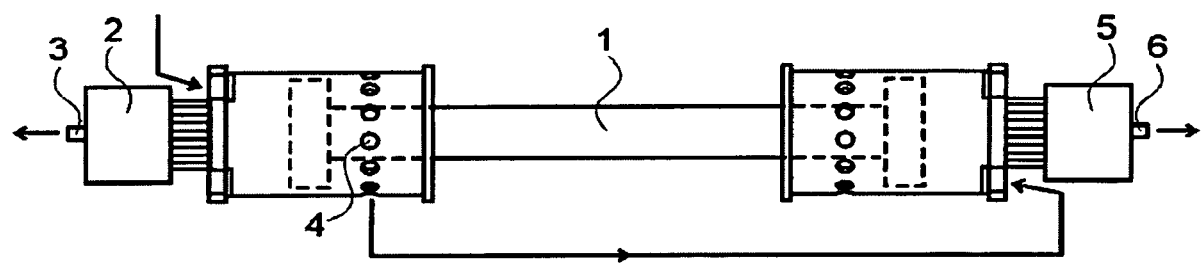
FIG. 11 is an embodiment of the device for the co-production of relatively high purity oxygen and nitrogen.

FIG. 11 illustrates a separations system configured to coproduce two high purity products. Thruster/piston assembly 1 delivers pressurized air to contactor 2, which contains carbon molecular sieve material. This material adsorbs oxygen and produces a highly enriched nitrogen product, delivered through product 1 outlet port 3. The waste gas, containing about 40% oxygen, exits at raffinate outlet ports 4 and is delivered to adsorbent contactor 5, which contains a 13× zeolite material suitable for adsorbing nitrogen. Nitrogen is removed from this gas stream and a high purity oxygen product exits at product 2 outlet port 6.

Example 12

Figure 13B:
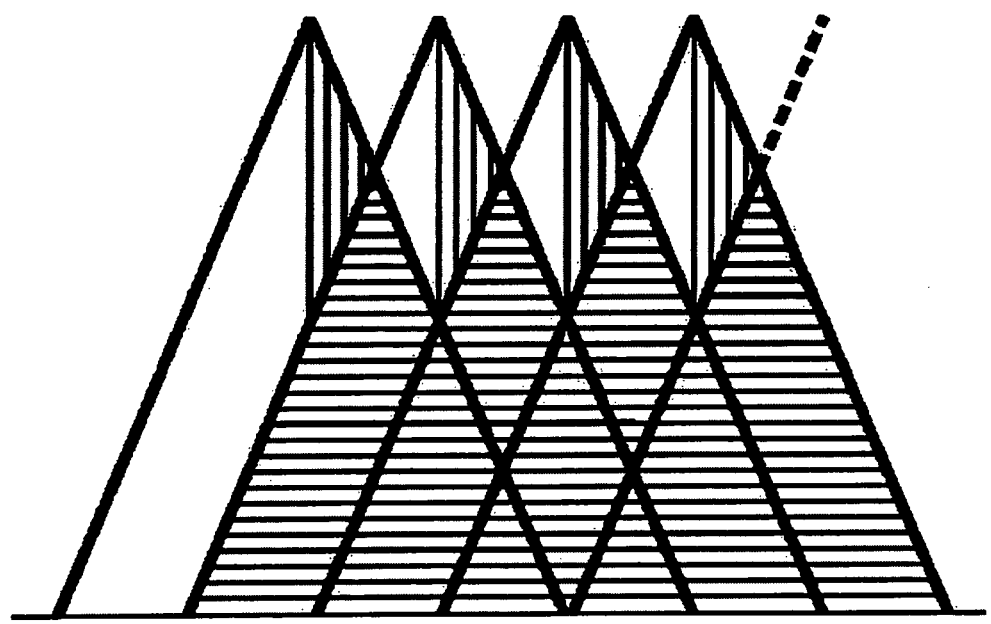
FIG. 13B is an idealized graph showing the increased recuperative ability of a four-chamber system.

FIGS. 13A and 13B illustrate how increased efficiency may be attained by using multiple compression/adsorption chambers instead of just two. The horizontally shaded area 12 represents desorption energy that can be directly returned to the system via mechanical linkages.

Example 13

FIGS. 14A and 14B show how an eccentric 13 or a swash plate 14 may be used to convert rotary motion to reciprocating motion, and how multiple compression/adsorption chambers can be interconnected via such mechanisms.

Example 14

In FIG. 15, thermoelectric devices 15 are cycled to create temperature variations in moisture adsorption chambers 16. The resulting dry air is heated by a resistance heater 17 and used to regenerate the gas separation adsorbents. The system shown in FIG. 15 may be a part of a gas separation module, or may be contained in a docking station such as would be used to charge and regenerate a portable medical oxygen concentrator.

When ranges are used herein for physical properties, such as molecular weight, or chemical properties, such as chemical formulae, all combinations, and subcombinations of ranges specific embodiments therein are intended to be included.

The disclosures of each patent, patent application and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A device for separating a fluid mixture, comprising:
a first unit consisting essentially of:
  a first chamber;
  a first inlet with a check valve for entry of said fluid mixture comprising a first component and a second component;
  a first outlet for removal of said first component;
  a first sorbent structure comprising an entrance, an exit, and a first sorbent for said first component; and
  a first thermal regenerator;
at least one second unit comprising:
  a second chamber;
  a second inlet with a check valve for entry of a fluid; and
  a second outlet with an optional check valve for removal of a fluid;
optionally, at least one thermoelectric temperature swing drying unit; and
a reciprocating biaser connected to said first chamber and said second chamber;
wherein said reciprocating biaser comprises two opposing pistons;
wherein said reciprocating biaser, said two opposing pistons, said first chamber, and said second chamber are arranged linearly.

2. A device according to claim 1, wherein said first inlet is adjacent to said first sorbent structure.

3. A device according to claim 1, further comprising: a source of electromagnetic radiation.

4. A device according to claim 3, wherein said source of electromagnetic radiation generates a multiphase electric field.

5. A device according to claim 3, further comprising: a water permeable material surrounding said device, said first unit, said second unit, or a combination thereof.

6. A device according to claim 1, further comprising: one or more antennae.

7. A device according to claim 1, further comprising: an air induction unit.

8. A device according to claim 1, further comprising: a data collection component.

9. A device according to claim 1, further comprising: a user interface component.

10. A device according to claim 1, wherein said reciprocating biaser further comprises: a power source to move said pistons in a reciprocating motion; an optional servo motor; an optional amplifier; an optional polyphase power source; and an optional motor feedback controller.

11. A device according to claim 10, wherein said power source is a battery.

12. A device according to claim 10, wherein said power source is a capacitive electrostatic, electromagnetic, electrodynamic, or piezoelectric actuator.

13. A device according to claim 1, wherein said second unit further comprises: a second sorbent structure comprising an entrance, an exit, and a second sorbent for said first component.

14. A device according to claim 13, wherein said second inlet is adjacent to said second sorbent structure.

15. A device according to claim 1, wherein said second unit further comprises:
a thermal regenerator.

16. A device according to claim 1, wherein said first chamber and said second chamber have the same internal volume.

17. A device according to claim 1, wherein said first chamber has an internal volume that is greater than the internal volume of said second chamber.

18. A device according to claim 1, wherein said first chamber has an internal volume that is at least about twice as great as the internal volume of said second chamber.

19. A device according to claim 1, wherein said second inlet is an inlet for a fluid mixture comprising a first component and a second component.

20. A device according to claim 1, wherein said second inlet is an inlet for said second component.

21. A device according to claim 1, wherein said second outlet is an outlet for removal of said second component.

22. A device according to claim 1, wherein said mixture is air.

23. A device according to claim 1, wherein said first sorbent is a sorbent for nitrogen.

24. A device according to claim 1, wherein said first heat regenerator is present and is a wire mesh connected to a material selected from the group consisting of diamond, ruby, copper, aluminum, and combinations thereof.

25. A system, comprising:
at least one device according to claim 1.

26. A system according to claim 25, wherein said system comprises a plurality of said devices.

27. A device for separating a fluid mixture, comprising:
a first unit consisting essentially of: a first chamber;
a first inlet with a check valve for entry of said fluid mixture comprising said first component and said second component;
a first outlet with an optional a check valve for removal of said first component;
a first sorbent structure comprising an entrance, an exit, and a first sorbent for said first component; and
an optional a first thermal regenerator;
at least two second units, wherein each of said second units comprising:
a chamber;
an inlet with a check valve for entry of a fluid; and
an outlet with an optional check valve for removal of a fluid;
optionally, at least one thermoelectric temperature swing drying unit; and
a reciprocating biaser connected to said first chamber and to said chamber of each of said second units;
wherein said reciprocating biaser is connected to said first chamber and to said chamber of each of said second units via a mechanical power transmission connection; and
wherein said mechanical power transmission connection is a scotch yoke, eccentric crankshaft, a swash plate, a nutating disc, a wankel type compressor, or a sliding vane compressor.

28. A device for separating a fluid mixture according to claim 27, wherein said device comprises a total of at least four units.

29. A device for separating a fluid mixture according to claim 27, wherein said device comprises a total of at least five units.

30. A device for separating a fluid mixture according to claim 27, wherein said device comprises a total of at least six units.

31. A device for separating a fluid mixture according to claim 28, wherein said device further comprises a momentum conserving device.

32. A device for separating a fluid mixture according to claim 28, wherein said device further comprises an electric storage device.

* * * * *

UNITED STATES PATENT AND TRADEMARK OFFICE
CERTIFICATE OF CORRECTION

PATENT NO. : 8,500,852 B2  Page 1 of 1
APPLICATION NO. : 12/299072
DATED : August 6, 2013
INVENTOR(S) : S. Douglas Galbraith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this
Fifteenth Day of September, 2015

Michelle K. Lee
*Director of the United States Patent and Trademark Office*